US008606800B2

(12) United States Patent  (10) Patent No.: US 8,606,800 B2
Lagad et al.  (45) Date of Patent: *Dec. 10, 2013

(54) COMPARATIVE WEB SEARCH SYSTEM

(75) Inventors: Hardik H. Lagad, Columbus, OH (US); Guozhu Dong, Beavercreek, OH (US)

(73) Assignee: Wright State University, Dayton, OH (US)

( * ) Notice: Subject to any disclaimer, the term of this patent is extended or adjusted under 35 U.S.C. 154(b) by 293 days.

This patent is subject to a terminal disclaimer.

(21) Appl. No.: 13/025,752

(22) Filed: Feb. 11, 2011

(65) Prior Publication Data

US 2011/0137883 A1  Jun. 9, 2011

Related U.S. Application Data

(63) Continuation of application No. 12/034,343, filed on Feb. 20, 2008, now Pat. No. 7,912,847.

(51) Int. Cl.
 *G06F 7/00* (2006.01)
(52) U.S. Cl.
 USPC ........... 707/758; 707/736; 707/748; 715/236; 709/203
(58) Field of Classification Search
 USPC ................................................. 715/230–256
 See application file for complete search history.

(56) References Cited

U.S. PATENT DOCUMENTS

| | | | |
|---|---|---|---|
| 5,864,845 A | 1/1999 | Voorhees et al. | |
| 6,275,820 B1 | 8/2001 | Navin-Chandra et al. | |
| 6,298,174 B1 | 10/2001 | Lantrip et al. | |
| 6,326,962 B1 | 12/2001 | Szabo | |
| 6,868,525 B1 | 3/2005 | Szabo | |
| 6,920,448 B2 | 7/2005 | Kincaid et al. | |
| 2002/0095404 A1 | 7/2002 | Davies et al. | |
| 2002/0107835 A1 | 8/2002 | Coram et al. | |
| 2005/0102259 A1 | 5/2005 | Kapur | |
| 2005/0278321 A1 | 12/2005 | Vailaya et al. | |
| 2006/0026152 A1 | 2/2006 | Zeng et al. | |
| 2006/0117002 A1 | 6/2006 | Swen | |
| 2008/0319947 A1* | 12/2008 | Latzina et al. | 707/3 |

OTHER PUBLICATIONS

Oztekin et al. Expert Agreement and Content Based Reranking in a Meta Search Envrionment Using Mearf. May 2002.*
Wu et al. Clustering of the Self-Organizing Map Using a Clustering Validity Index Based on Inter-cluster and Intra-cluster Density. Jun. 20, 2003.*
Gulli, Antonino, "On Two Web IR Boosting Tools: Clustering and Ranking", Ph.D. Thesis, Universita degli Studi di Pisa, Dipartimento di Informatica, Dottorato di Ricerca in Informatica, May 6, 2006, pp. 1-143, available at www.webir.org/resources/phd/Gulli_2006.pdf.
Martins, Bruno, "Inter-Document Similarity in Web Searches", Departamento de Informatica, Faculdade de Ciencias da Universidade de Lisboa, Oct. 2004, pp. 1-140, available at http://www.di.fc.ul.pt/tech-reports.

(Continued)

*Primary Examiner* — Shyue Jiunn Hwa
*Assistant Examiner* — Tuan-Khanh Phan
(74) *Attorney, Agent, or Firm* — Dinsmore & Shohl LLP

(57) ABSTRACT

A system and method for a comparative web search engines, search result summarization, web snippet processing, comparison analysis, information visualization, meta-clustering, and quantitative evaluation of web snippet quality are disclosed. The present application extends the capabilities of web searching and informational retrieval by providing a succinct comparative summary of search results at either the object or thematic levels.

3 Claims, 14 Drawing Sheets

(56) References Cited

OTHER PUBLICATIONS

Kandogan, Eser, "Star Coordinates: A Multi-dimensional Visualization Technique with Uniform Treatment of Dimensions," IBM Almaden Research Center, pp. 1-4, available at http://scipp.ucsc.edu/groups/retina/articles/starcoords.pdf.

Oztekin, B. Uygar et al., "Expert Agreement and Content Based Reranking in a Meta Search Environment using Mearfl," University of Minnesota, Department of Computer Science/Army HPC Research Center, May 7-11, 2002, pp. 1-24.

Thumbshot.com screenshot, http://ranking.thumbshot.com, Oct. 13, 2006.

Kummarmuru, et al., "A Hierarchical Monothetic Document Clustering Algorithm for Summarization and Browsing Search Results" 2004, ACM, p. 658-665.

Google, "Google Help: Search Features" Feb. 8, 2006, www.google.com (via archive.org), p. 1-10.

* cited by examiner

COMPARATIVE WEB SEARCH SYSTEM

CROSS REFERENCE TO RELATED APPLICATIONS

The present application is a continuation application of U.S. patent application Ser. No. 12/034,343, filed on Feb. 20, 2008 now U.S. Pat. No. 7,912,847.

BACKGROUND

The present application relates generally to Web-based information searching and retrieval, and more particularly to a system and method performing a comparative web search providing a meta-search engine search, web snippet processing and meta-clustering, comparison analysis, quantitative evaluation of web snippet quality, search result summarization, and information visualization.

Generic web-based search engines such as, for example, Google®, Yahoo® and AlltheWeb® are independent systems that index billions of web pages. When a user submits a search request, it is often the case that the search engines return large and unmanageable volumes of results, many of which are irrelevant or not useful to what the user is seeking. In addition, such search engines use some ranking algorithm to order the search results. However, certain more relevant results might be ranked lower than certain less relevant or even irrelevant ones.

The human compiled web directories such as OpenDirectory®, Yahoo Directory®, and LookSmart® often return high-quality documents with high relevance to the queries. A hierarchical directory path is associated with every result, which helps the user in understanding the placement of the query in the category tree. However, the scope of web directories is very limited and they often fail to generate quality results for very specialized queries or very general queries. In addition, such web directories typically do not index the websites periodically. Like generic search engines, web directories also employ the ranked listing paradigm to present their output which often prolongs the process of locating desired result(s).

Even the most sophisticated generic search engines find it challenging to keep up with changes occurring in the super dynamic environment of WWW. Utilizing two or more search engines may better meet the information needs and provide a comprehensive set of search results. Multi-search engines such as Multi-Search-Engine.Com®, and Searchthingy. Com® bridge this information gap by assimilating results from different search engines and presenting them to the user in separate windows. Moreover, multi-search engines can recommend a search engine to a user he/she may not have considered. Though multi-search engines may satisfy the needs of a comprehensive search, they do not simplify the task of locating a desired document.

Like multi-search engines, meta-search engines also bridge the information gap by assimilating results from various search engines. However, they refine the accumulated search results before presenting them to the user. Meta-search engines can be broadly grouped into three main categories in terms of result presentation: Meta-Search Engines with Ranked Listings of Results; Meta-Clustering Search Engines; and Other Visualization Tools. Each of these categories is addressed hereafter.

Meta-Search Engines with Ranked Listings of Results. This class of meta-search engine reduces the length of search results by removing duplicate results. Examples of such systems include Dogpile®, Metacrawler®, and Mamma® search engines. Moreover, these systems eliminate the heuristic bias by re-ranking the results based on complex weighting algorithms. Accordingly, the result set of a meta-search engine can be more informative and diverse as compared to the result set of any one search engine. However, even in this case where results are presented in ranked lists, the process of locating desired document(s) from the ranked lists is often time consuming for the user.

Meta-Clustering Search Engines.

In addition to duplicate removal, meta-search engines such as, for example, Grouper®, Vivisimo®, SnakeT®, and iBoogie® condense the search result presentation space by several orders of magnitude by organizing their results in hierarchical clusters. Despite their state-of-the-art technology, present meta-clustering search engines are strictly single query processing systems and do not handle more than one query request from a user at a time.

Other Visualization Tools.

In recent years, the Internet has seen the advent of several innovative visual tools that have broadened the scope of search engines beyond information retrieval. Three diverse visualization tools, which represent this class of meta-search engines are Kartoo®, WebBrain®, and WhatsOnWeb (WOW)®. Each of these meta-search engines is addressed hereafter.

Kartoo® is a meta-search engine which offers cartographic visualization of query results. Despite its suitable visualization interface, Kartoo lacks the ability to display relationships between clusters. In addition, since Kartoo users can browse through only one map at a time, they need to explore all the maps generated in response to a query to determine the complete set of thematic relationships between all the documents in the result set. Also, a typical map generated by Kartoo consists of only 10-12 documents making the task of locating desired document equally challenging to the user as in the case of ranked lists.

WebBrain® is a special meta-search engine that queries only one database—the Open Directory® (OD). WebBrain is a useful tool to visualize related information on the Web but it suffers from the limitations of its underlying Web directory. Since OD's database is much smaller than the databases of generic search engines, queries on specific topics often generate poor or no results on WebBrain.

WhatsOnWeb (WOW)® dynamically generates hierarchical clusters based on a topology-driven approach. The clusters are presented using a snippet graph that illustrates the semantic connections between clusters. It appears that this visualization standard overcomes the limitations of Kartoo®. Moreover, WOW queries more than one database to collect its data, which makes it a more versatile tool than WebBrain. However, the response time of WOW is much longer than other meta-search engines due to the high complexity $[O((n^2) m+(n^3) \log n)]$ of the topology-driven approach. Here, 'n' is the number of unique documents in the result set of a query and 'm' is the total number of semantic connections between all documents. In addition, the topographic overview of the results may not be easily comprehensible to average users.

The key motivating factor behind all search engines discussed above, with an exception of a few visualization tools, is information retrieval (IR). Even those visualization tools that are driven by knowledge discovery and employ innovative ways to synergize IR and knowledge representation, have yet to explore the territory of comparison analysis of two or more query result sets for knowledge extraction. Currently, there appears to be a limited number of search engines that perform comparison analysis such as, for example, SnakeT® and Thumbshots®. However, these noted search engines only perform object-level, rank comparison analysis. Moreover, their rudimentary interfaces do not simplify the task of locating desired documents and do not help avoid reading of repeated materials.

SUMMARY

The present application provides a system and method performing a comparative web search providing a meta-search engine search, web snippet processing and meta-clustering, comparison analysis, quantitative evaluation of web snippet quality, search result summarization, and information visualization. The present disclosure extends the capabilities of web searching and informational retrieval by providing a succinct comparative summary of search results at either the object or thematic levels.

In one aspect of the present application, a method performing a comparative web search is disclosed. The method comprises providing a meta-search engine in communication with a plurality of web-based search engines; and providing the meta-search engine with a query, a search mode, and a selected set of the web-based search engines. The meta-search engine uses the query to search for documents on the selected set of the web-based search engines. The method also includes retrieving automatically search results from each of the web-based search engines in the selected set in the form of at least web snippets or documents from each member of the selected set of the web-based search engines and using the search result as raw data; and providing automatically the raw data to a data pre-processing module which automatically removes stop words and HTML tags, and applies a stemming algorithm, resulting in pre-processed data; providing automatically the pre-processed data to a comparison engine, the comparison engine performing an object level comparison or a thematic level comparison depending on which comparison is specified in the search mode, the comparison resulting in a plurality of result sets from the selected set of the web-based search engines. The method also includes determining automatically logical relationships between each of the plurality of result sets and providing a results comparison of the determined logical relationships; organizing automatically the search results in ranked lists when the object level comparison is performed by the comparison engine and labeled hierarchical clusters when the thematic level comparison is performed by the comparison engine, the organizing resulting in organized search results; and outputting the results comparison and the organized search results for viewing.

In another aspect of the present application, a system implementing the method performing a comparative web search is also disclosed.

Additional aspects and advantages will become apparent in view of the following detailed description and associated figures.

BRIEF DESCRIPTION OF THE DRAWINGS

The present disclosure will become more fully understood from the following detailed description, taken in conjunction with the accompanying figures, wherein like reference numerals refer to like elements, in which.

DETAILED DESCRIPTION

Figure 1:
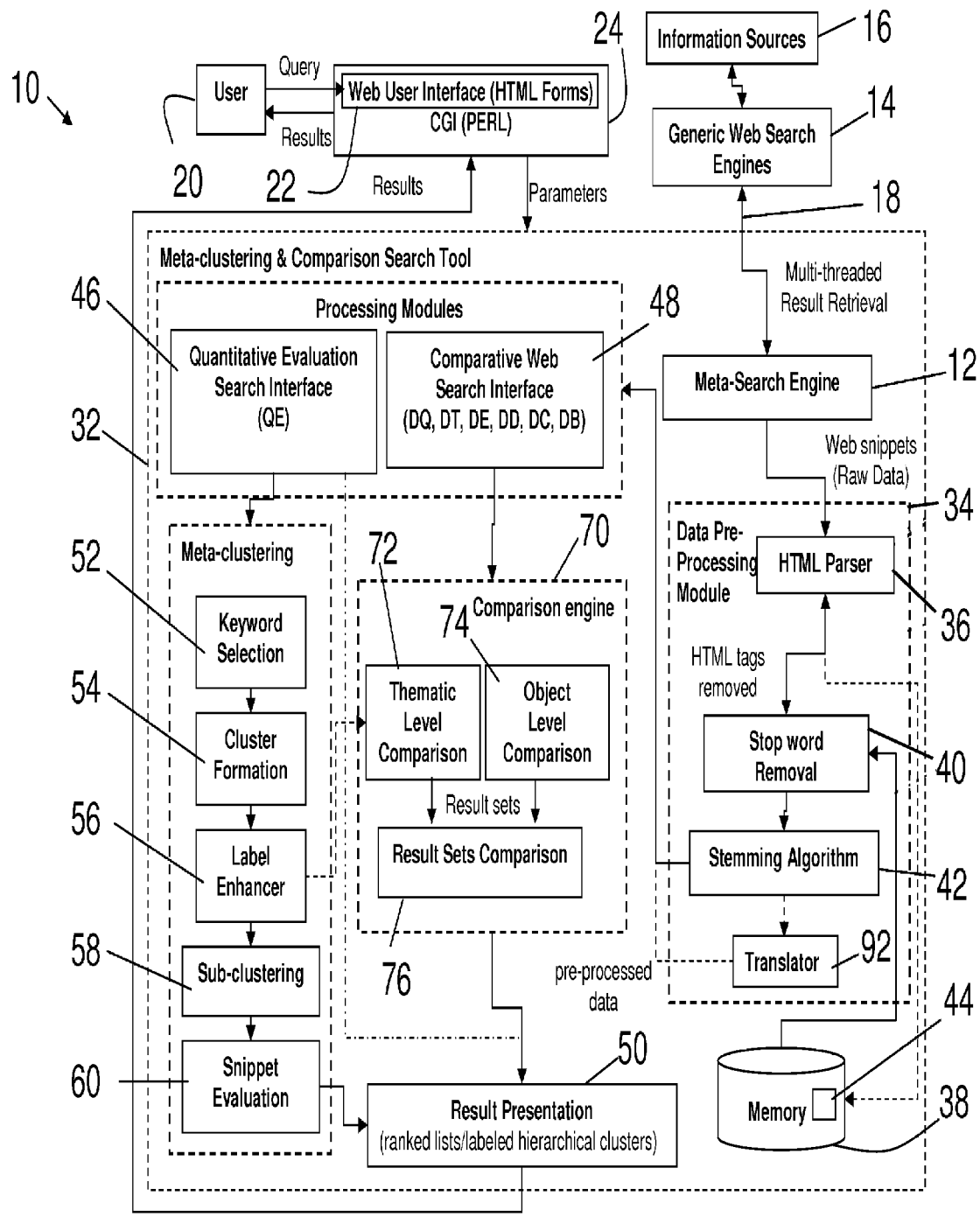
FIG. 1 is an architectural schematic of a system according to the present disclosure.

Before turning to the figures, which illustrate several embodiments in detail, it should be understood that the disclosure is not limited to the details or methodology set forth in the description or illustrated in the figures. It should also be understood that the terminology is for the purpose of description only and should not be regarded as limiting.

Where a range of values is provided, it is understood that each smaller range between any stated value or intervening value in a stated range and any other stated or intervening value in that stated range is encompassed within the disclosure. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and systems similar or equivalent to those described herein can be used in the practice or testing of the present disclosure, the preferred methods and systems are now described. All publications mentioned herein are incorporated herein by reference to disclose and describe the methods and/or systems in connection with which the publications are cited.

It must be noted that as used herein and in the appended claims, the singular forms "a", "and", and "the" include plural referents unless the context clearly dictates otherwise. Thus, for example, reference to "a result" includes a plurality of such results and reference to "the cluster" includes reference to one or more clusters and equivalents thereof known to be those skilled in the art, and so forth.

The publications discussed herein are provided solely for their disclosure prior to the filing date of the present application. Nothing herein is to be constructed as an admission that the present disclosure is not entitled to antedate such publication by virtue of prior disclosure. Further, the dates of the publication provided may be different from the actual publication dates which may need to be independently confirmed.

The term "URL" is an acronym for "uniform resource locator", which designates the "address" or location of a document, Web site or other information on the world wide web.

The term "web snippet" refers to an excerpt of a web page generated by a search engine. It usually consists of a few statements from the web page containing the query term(s) along with other meaningful keywords.

The term "query" refers to the information that is sent to the metasearch engine to define the subject matter that the user is interested in searching.

The term "user" refers to an agent, human, computer or other mechanism capable of providing a query and of receiving search results.

"May" means optionally.

"Local format" refers to a restricted grammar/language used to represent organization of data retrieved from generic web search engines into data structures, so that it can be used to link information, and compare results more efficiently.

Referring first to FIG. 1, an architectural schematic of a system 10 for performing a comparative web search and an evaluation of web snippet quality according to the present disclosure is shown. A metasearch (multi-site query) engine 12 is provided with the capability of communicating with and using multiple conventional search engines 14 to retrieve results from various information sources 16, such as web pages and documents, via the Internet 18 as web snippets for processing. It is to be appreciated that a variety of information sources or repositories may be searched including standard web-based sites which are accessible by conventional search engines such as, for example, Google®, Yahoo®, and AlltheWeb®. Other data specific sites such as Wikipedia®, and Koders®, which are capable of web interfacing can also be used. Even similar sorts of engines, such as the generic search engines, have different priorities about what sites they search and therefore the present disclosure is capable of using numerous engines for generic sites and other domain specific sites.

Parameters such as search terms of the query, a search mode, a selected set of the web-based search engines 14 to use for the search, and a requested number of results may be inputted by a user 20 via a web-enabled user interface (UI) 22. The search modes of the present disclosure are DQ, DT, DE, DD, DC, DB, and QE. DQ refers to a comparison between two (or more) result sets retrieved from generic search engine(s) in response to two (or more) distinct queries. DT refers to a comparison between two (or more) result sets retrieved from generic search engine(s) in response to a common query performed at different intervals on time. DE refers to a comparison between two (or more) result sets retrieved from two (or more) generic search engines in response to a common query. DD refers to a comparison between two (or more) result sets retrieved from generic search engine(s) in response to a common query such that each participating result set meets following two conditions: (a) all results in a result set belong to same domain such as, for example, .com, .gov, etc., and (b) there is no domain similarity among participating result sets. DC refers to a comparison between two (or more) result sets retrieved from generic search engine(s) in response to a common query such that each participating result set meets following two conditions: (a) all results in a result set belong to same country/geographical region, and (b) there is no country/geographical region similarity among participating result sets. DB refers to comparison between two (or more) segments of a result set retrieved from generic search engine in response to a query for comparing multiple segment of a search result. Finally, QE refers to a quantitative evaluation of the results retrieved from a selected one of the search engines 14 in response to a query.

To provide the above mentioned search modes (or modes of search), the illustrated embodiment of the user interface 22 comprises seven HTML forms, one for each search mode supported i.e., six comparative, and one quantitative evaluation. FIGS. 2-8 are illustrative depiction of the UI 22 each providing one of the above mentioned search modes. The layout of the UI 22 on a conventional web browser 24 is generally the same for each of the search modes, where a logo section (pane) 26 is displayed at the top, followed by a search mode section (pane) 28 providing hyperlinks for selection of the search modes DQ, DT, DE, DD, DC, DB, and QE, and a search-specific parameters section (pane) 30 at the bottom. It is to be appreciated that the search-specific parameters section (pane) 30 changes dynamically in the UI 22 depending on which of the hyperlinks to the search modes DQ, DT, DE, DD, DC, DB, and QE is selected by the user. The search parameters for each of the search modes are discussion hereafter.

Figure 2:
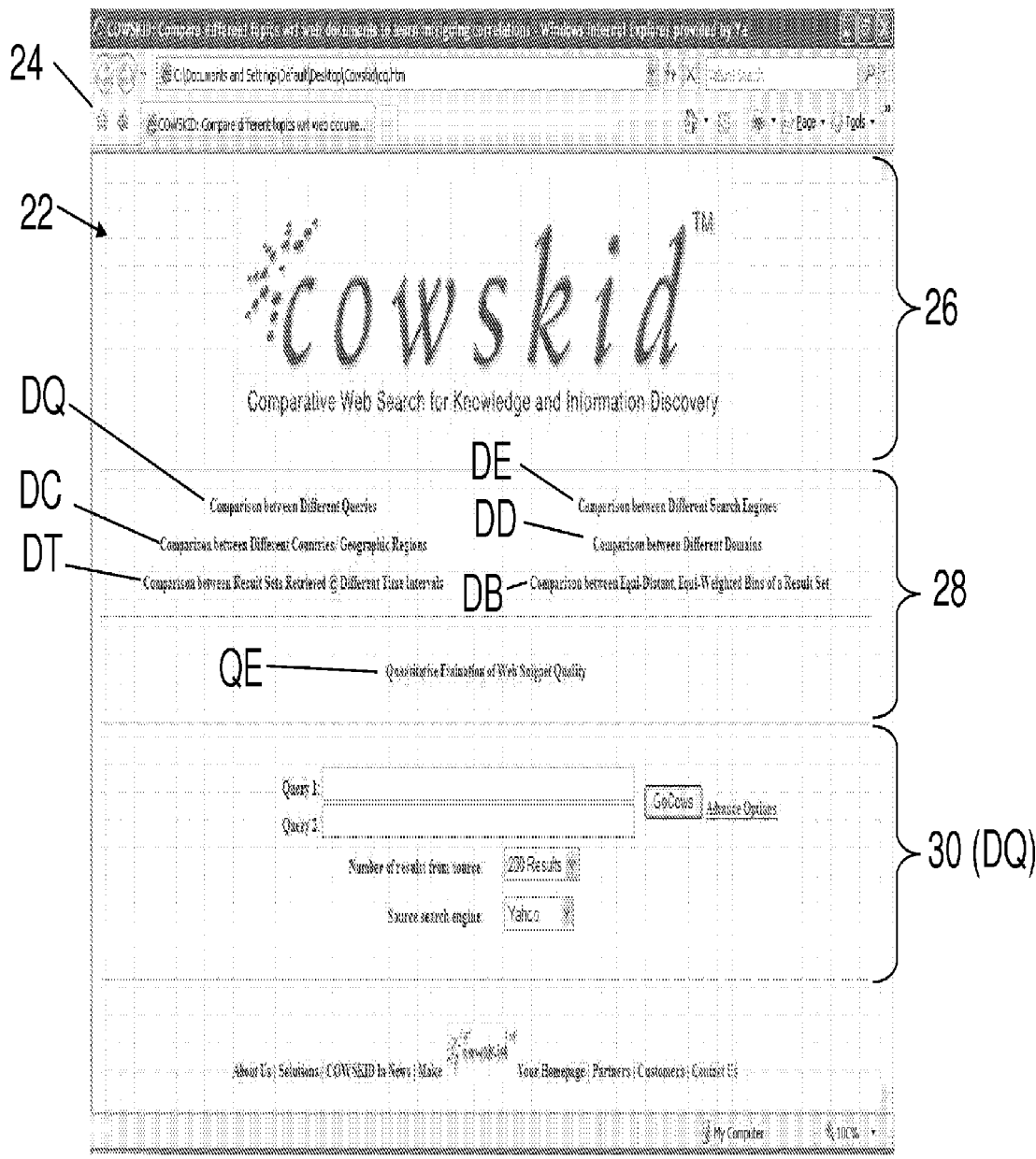
FIG. 2 shows an example of a screen display on a user interface which displays the form for comparative summarization of the result sets collected from generic search engines in response to different queries conducted using a system according to the present disclosure.

Referring to FIG. 2, the search-specific parameters section (pane) 30 is for the DQ search mode, a comparison between two (or more) result sets retrieved in response to different queries. For the DQ search mode, the search-specific parameters section (pane) 30 provides for the input of parameters via a query text box 1 for the first query, a query text box 2 for a second query, a first drop box for selecting a search engine 14 for both queries, and a second drop box for indicating a number of results to be retrieved from the selected search engine. For the DQ search mode, the comparison performed by the present disclosure is at thematic level, which is explained in greater details hereafter in a later section.

Figure 3:
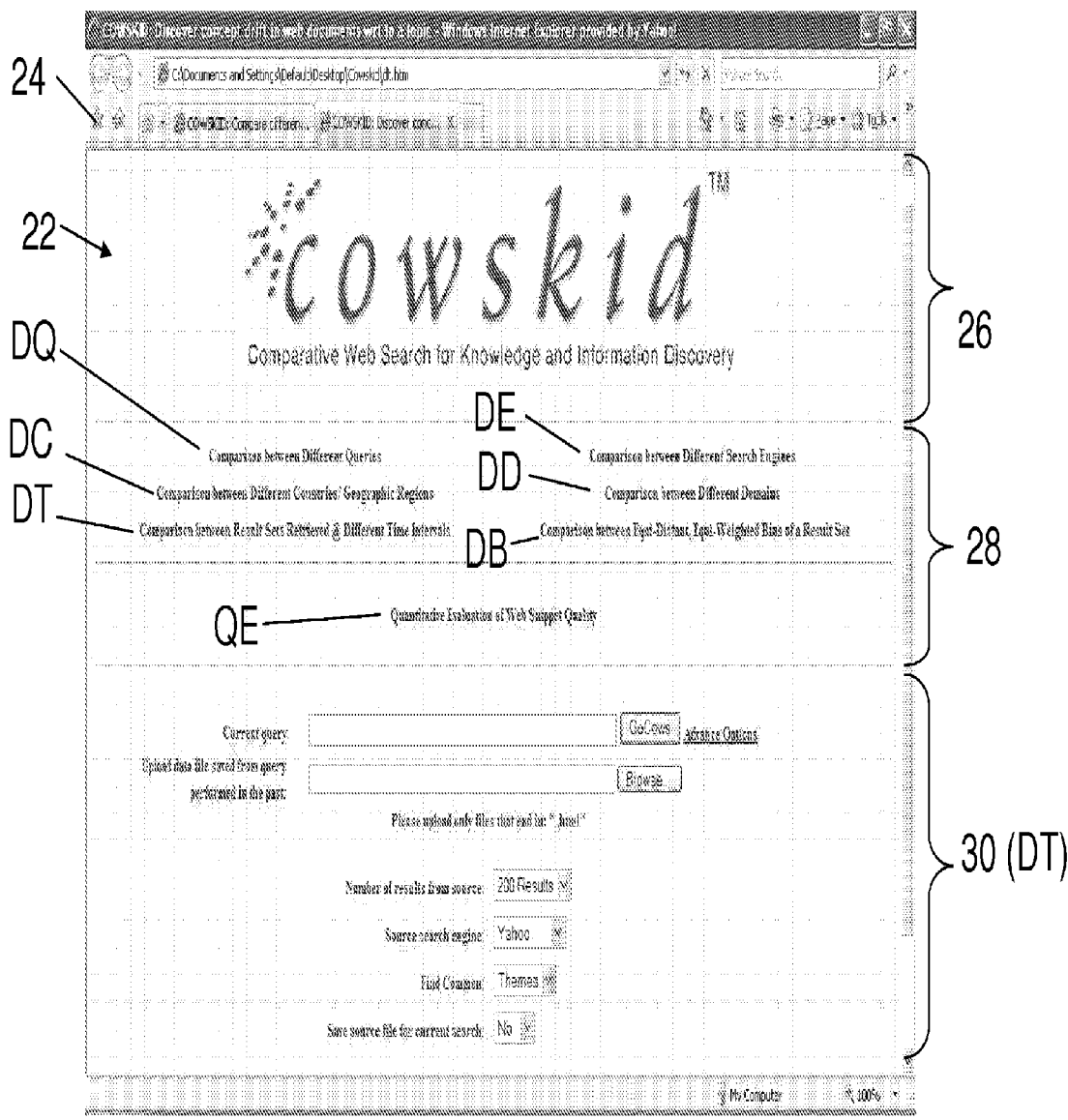
FIG. 3 shows an example of a screen display on a user interface which displays the form for comparative summarization of the result sets collected from generic search engines in response to a common query performed at different intervals of time conducted using a system according to the present disclosure.

FIG. 3 depicts the UI 22 providing the search-specific parameters section (pane) 30 for the DT search mode, a comparative search between two result sets retrieved in response to a common query performed at different points of time. For the DT search mode, the search-specific parameters section (pane) 30 provides input of the parameter via a textbox to select a raw data file from a user system which was stored during a search conducted in the past. Also provided is a textbox to enter present query, a drop box to select number of results to be retrieved, and a drop box to select a generic search engine for present query. Advance options include user's preference to save raw data file containing results from the present search and the form of comparison (thematic or object-level) desired. For best results using the DT search mode, all the parameter values in current query should match the parameter values in previous search.

Figure 4:
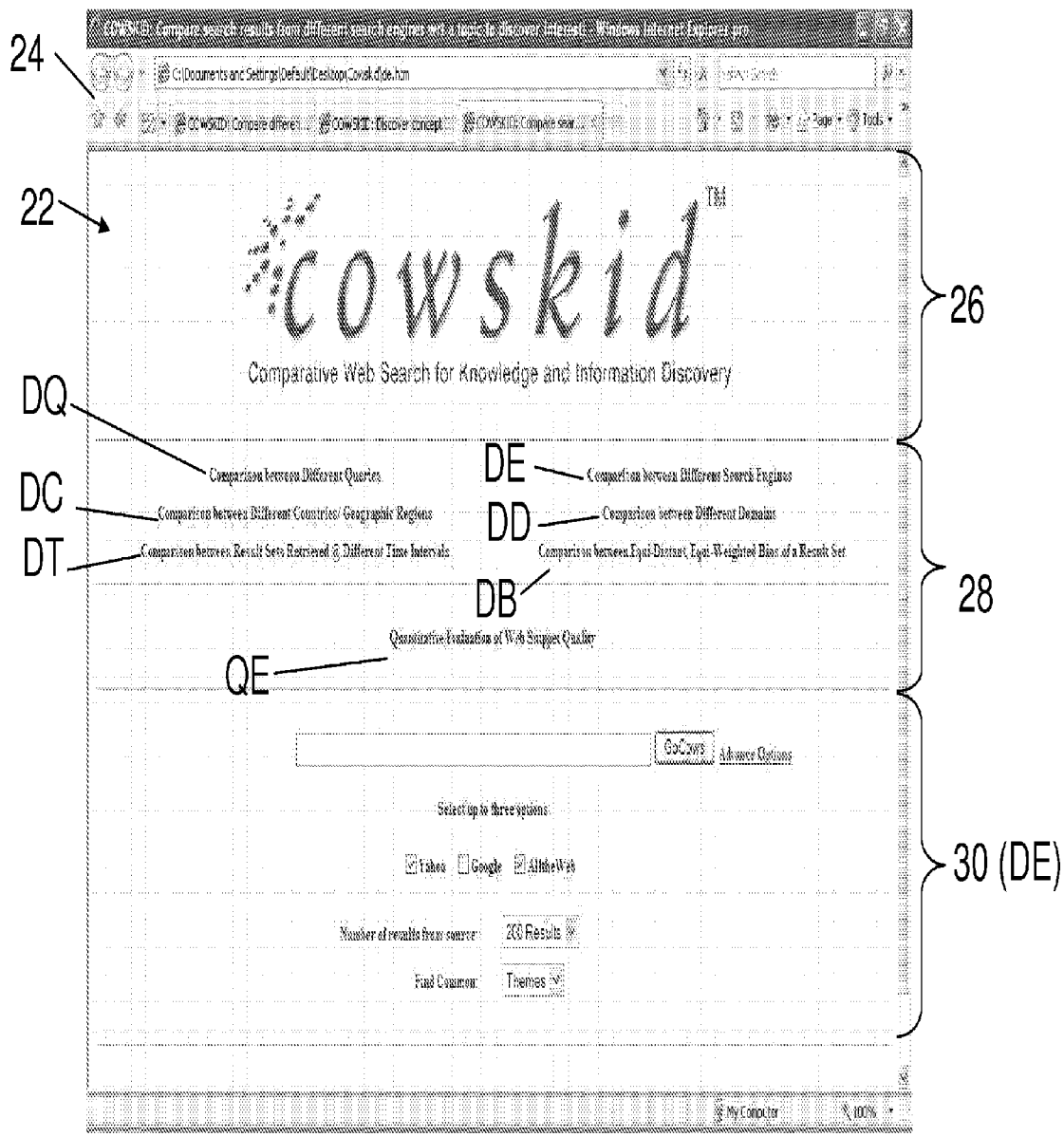
FIG. 4 shows an example of a screen display on a user interface which displays the form for comparative summarization of the result sets collected from different generic search engines in response to a common query conducted using a system according to the present disclosure.

FIG. 4 depicts the UI 22 providing the search-specific parameters section (pane) 30 for the DE search mode, a comparison between two (or three) result sets where each result set is retrieved from a different generic search engine in response to a common query. The search-specific parameters section (pane) 30 in the DE search mode provides for the input of parameters via a text box to enter a query, a common drop box to select number of results to be retrieved from each participating generic search engine, and one checkbox for each eligible generic search engine. In one embodiment, users can select up to three search engines for comparison, and in other embodiments, this form of comparison can be easily extended to more than three result sets. Once again, the advance option includes user's preference to compare the search results at either the object or thematic level.

Figure 5:
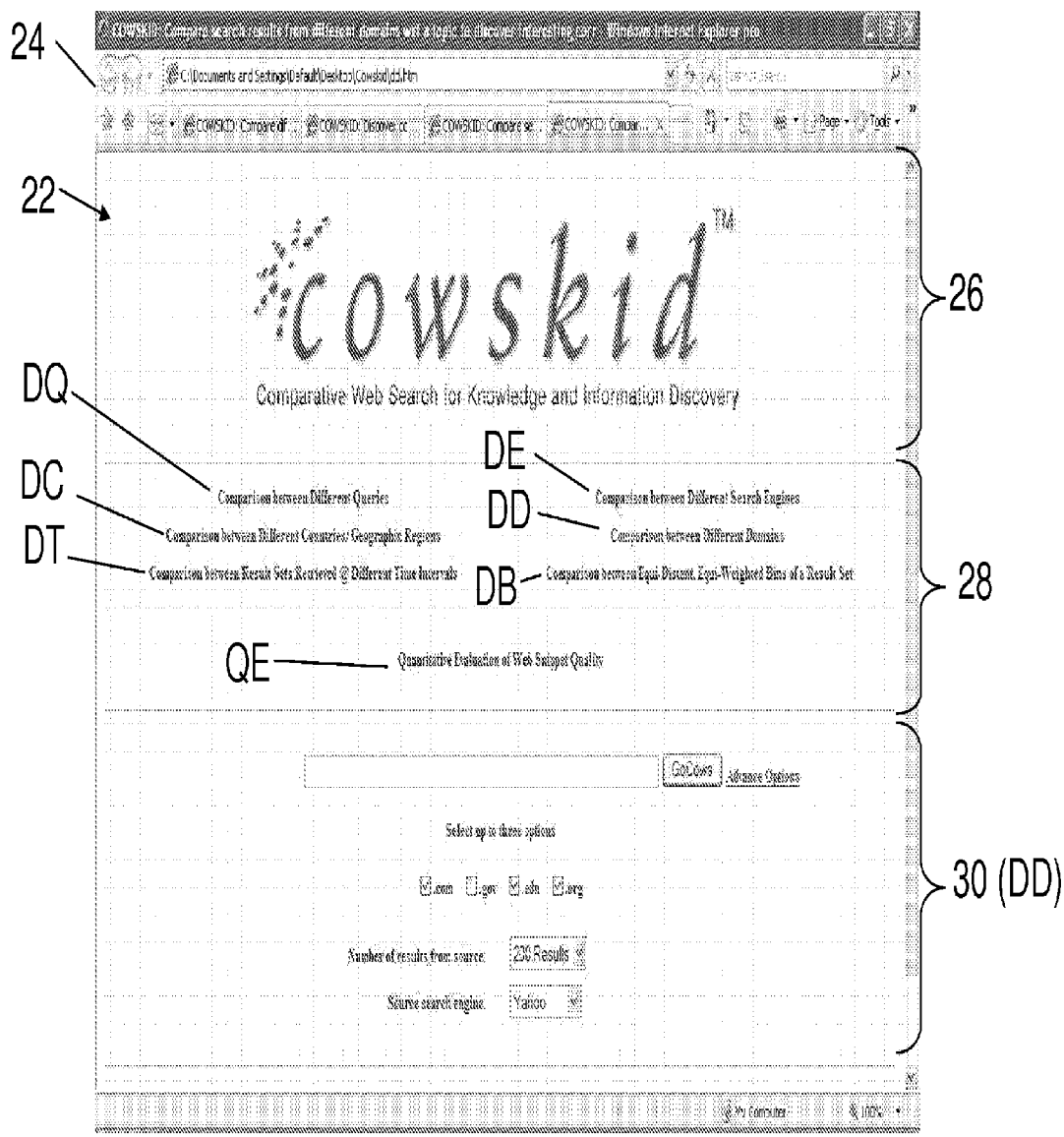
FIG. 5 shows an example of a screen display on a user interface which displays the form for comparative summarization of the domain-specific result sets collected from generic search engines in response to a common query conducted using a system according to the present disclosure.

FIG. 5 depicts the UI 22 providing the search-specific parameters section (pane) 30 for the DD search mode, a comparison between two or more domain specific result sets. The search-specific parameters section (pane) 30 in the DD search mode provides for the input of parameters via a checkbox for each domain (in the illustrated embodiment, users can select up to three), a common drop box for selecting the number of results to be retrieved for each selected domain, a common drop box for selecting a generic search engine and a textbox for entering a query. In this search mode, only thematic level comparison is applicable as will be explained in greater details hereafter in a later section.

Figure 6:
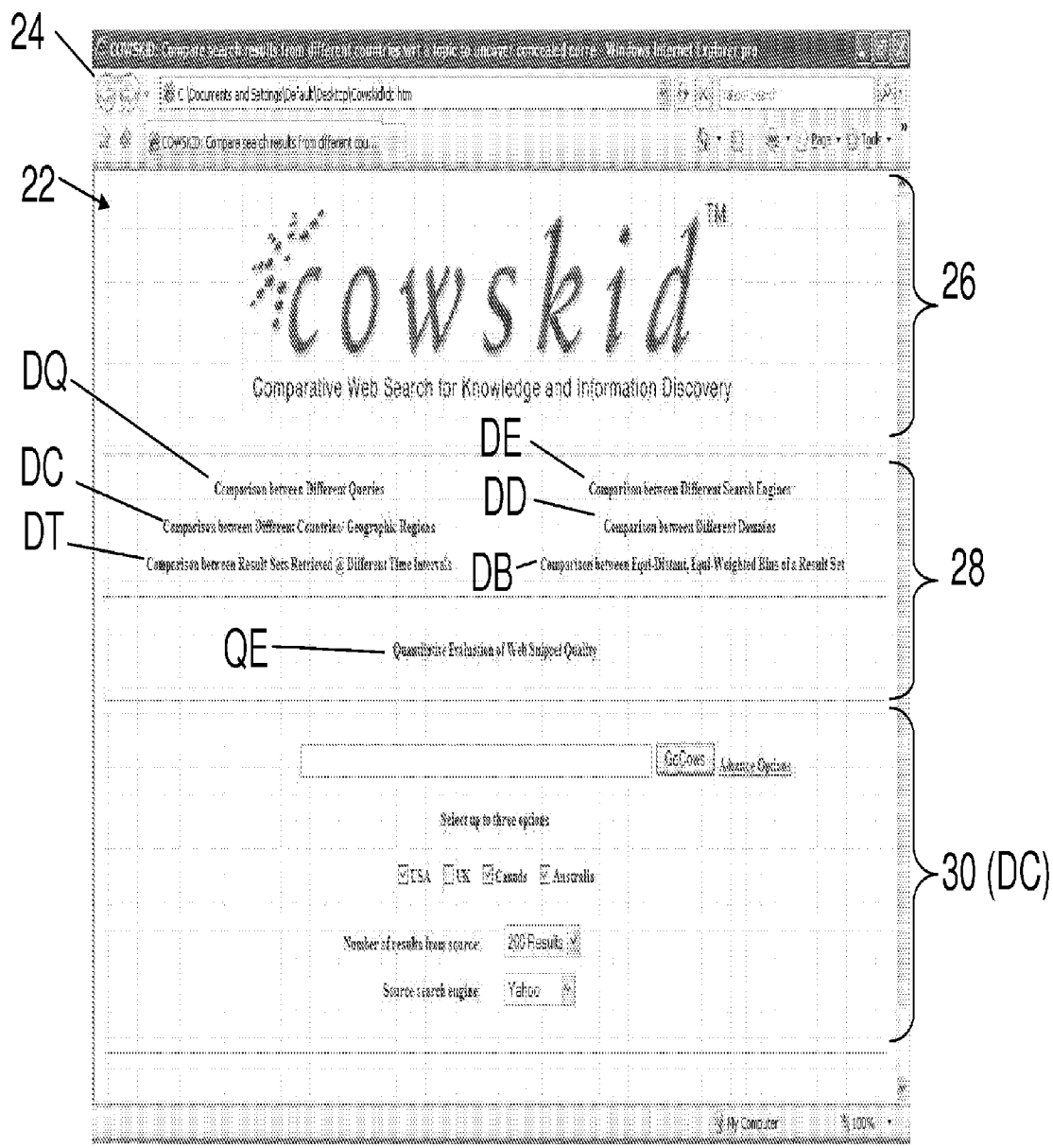
FIG. 6 shows an example of a screen display on a user interface which displays the form for comparative summarization of the result sets with different geographical origins/countries collected from generic search engines in response to a common query conducted using a system according to the present disclosure.

FIG. 6 depicts the UI 22 providing the search-specific parameters section (pane) 30 for the DC search mode, a comparison of result sets belonging to different geographic origins/countries, retrieved in response to a common query. The parameters specified in the search-specific parameters section (pane) 30 in the DC search mode are identical to those specified in case of domain-specific result sets comparison of the DT search mode. Here, the only difference is that domains are replaced with countries or geographical regions. Although, both thematic and object level comparisons are applicable in this case, since copies of one web document can have different URLs, data duplication is not common phenomenon on web and therefore only thematic level comparison is available in the DC search mode of comparison as will also be explained in greater details hereafter in a later section.

Figure 7:
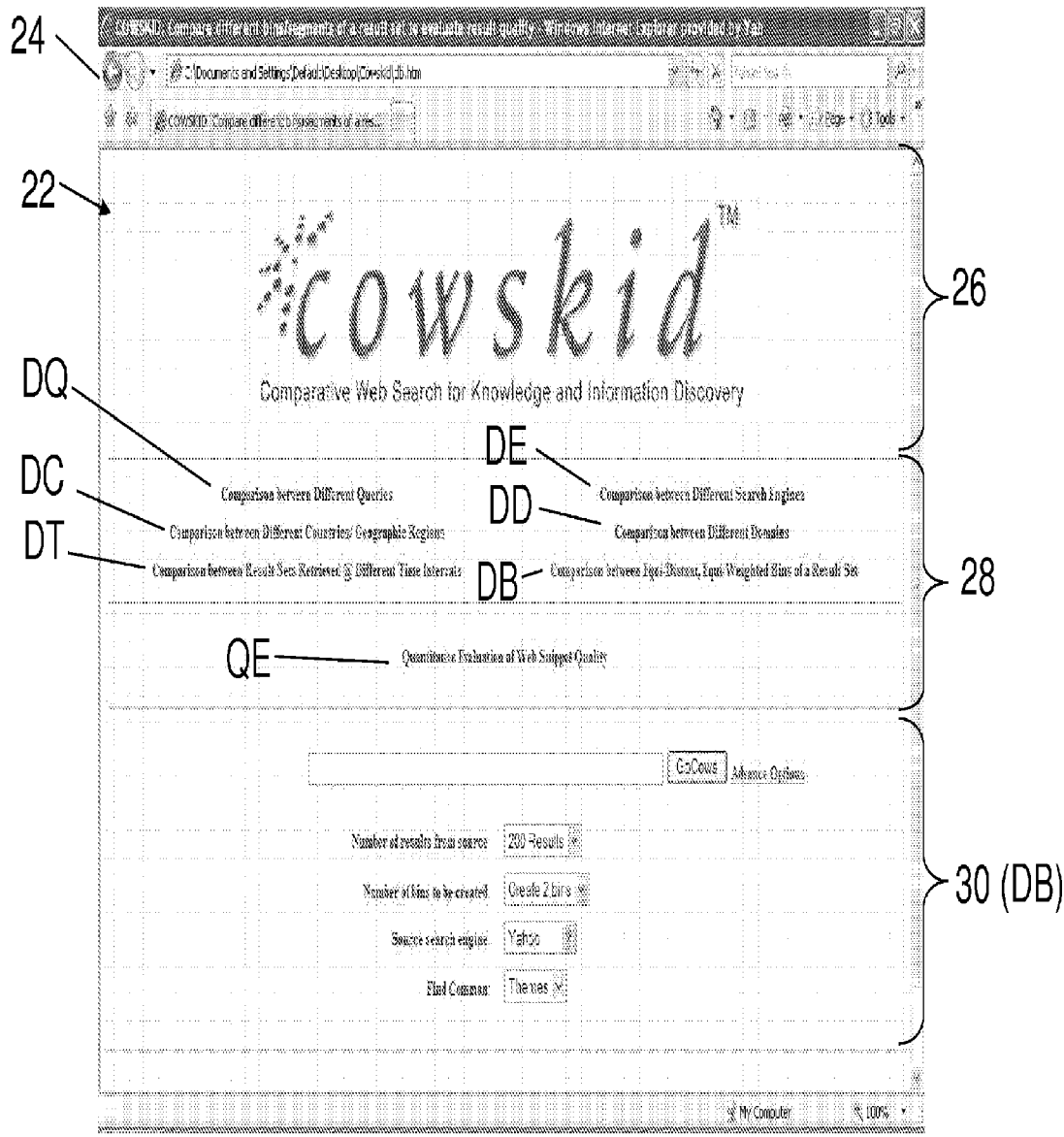
FIG. 7 shows an example of a screen display on a user interface which displays the form for comparative summarization of different bins of a result set collected from a generic search engine in response to a query conducted using a system according to the present disclosure.

FIG. 7 depicts the UI 22 providing the search-specific parameters section (pane) 30 for the DB search mode, a comparison between two or more equi-distant, equi-weighted bins of a result set. The search-specific parameters section (pane) 30 in the DB search mode provides for the input of parameters via a text box to enter a query, a drop box to select a generic search engine, a drop box to select the number of results to be retrieved, and a drop box to select the number of bins to be formed for comparison. In one embodiment, the selection for the number of bins is limited to either 2 or 3. The comparison can be performed at both thematic and object-level.

Figure 8:
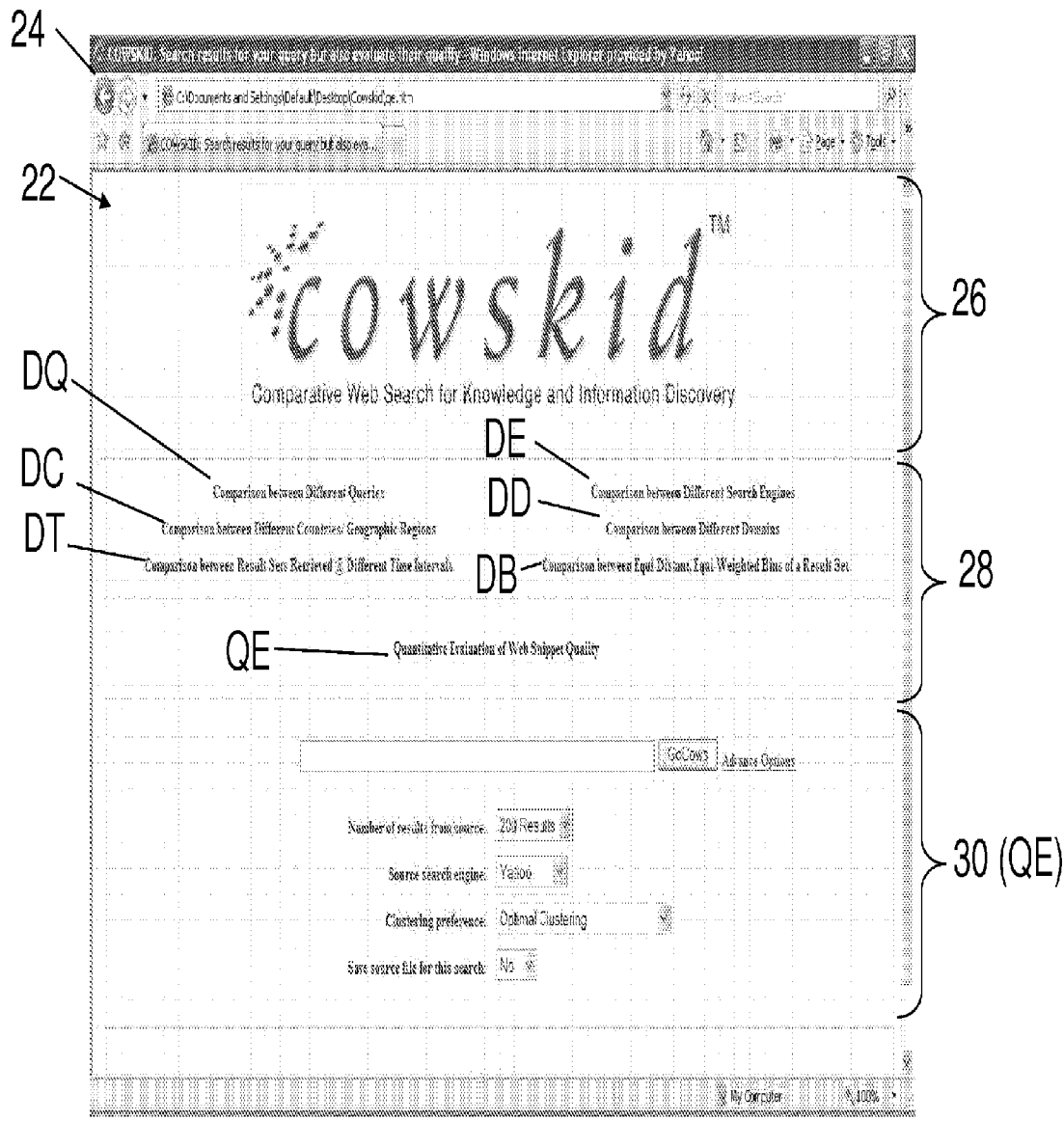
FIG. 8 shows an example of a screen display on a user interface which displays a form for quantitative evaluation of web snippet quality of a result set collected from a generic search engine in response to a query conducted using a system according to the present disclosure.

Finally, FIG. 8 depicts the UI 22 providing the search-specific parameters section (pane) 30 for the QE search mode, a quantitative evaluation of web snippets returned in a search result set. The search-specific parameters section (pane) 30 in the QE search mode provides for the input of parameters via a text box to enter query, a drop box to select a generic search engine, and a drop box to select the number of results to be retrieved. The advance options offered by this search mode include the choice of clustering technique (Use TF-IDF Scoring Mechanism, Cluster with Maximum Accuracy, Optimal Clustering, Show Results in Ranked Lists), and preference to save the current search (Yes, No). In one embodiment, if a user opts to save a current search, then only the input data file containing results from a generic search engines is saved. In one embodiment, the files are downloaded to the user's system. The above mentioned clustering preferences are explained in greater detail hereafter in later sections.

Turning once again to FIG. 1, after the user has entered the above mentioned parameters via the HTML form of the UI 22 representing the selected search mode, the browser 24 processes the form data via by a common gateway interface (CGI) script which parses the parameters and their values. In particular, the CGI script invokes a meta-clustering and comparison search tool 32 of the present disclosure (i.e., running on a server, not shown) which passes the user specified values to the included metasearch engine 12. If the user does not specify a value for a parameter or provides an invalid value then an error message is displayed on the UI 22. It is to be appreciated that the CGI script in the illustrated embodiment is a PERL program; however, other scripting languages, such as C, Java, Visual Basic, and the likes, and other methods of receiving and returning data between a server implementing the meta-clustering and comparison search tool 32 and the UI 22 may also be used, which may be hardware dependent.

The metasearch engine 12 uses the query search terms provided in the parameters to construct a query Universal Resource Locator (URL) string for each of the search engines 14 in the selected search engine set. The particular URL strings are then invoked by the metasearch engine 12 via hypertext transfer protocol (http) and the returned web snippets as they appear on the web are then passed on as raw data to a data pre-processing module 34. It is to be appreciated that the interface of the metasearch engine 12 of the present system is designed to expedite the result retrieval task by opening multiple connections via multi-threading. The raw data is then processed by the data pre-processing module 34 to provide pre-processed data that will be used by the meta-clustering and comparison search tool 32 to extract an individual search result set from the selected set of search engines 14.

The web snippet results retrieved via the metasearch engine 12 from the selected one of the search engines 14 are in HTML format. Therefore, a HTML parser 36 is used to eliminate the HTML tags, advertisements and other unnecessary data. The parsed results from the HTML parser 36 are provided in following format: Title (a list of words), Abstract (a list of words) and URL (string). In one embodiment, the parsed results may be stored in memory 38 for later processing. Next, the parsed results are sent to a stop-word removal process 40, and then to a stemming algorithm process 42. The stop-word removal process 40 uses a stop word list 44 provided in memory 38 to remove words from the parsed results which in one embodiment consists of 1061 words geared for the HTML domain. For the stemming algorithm, in one embodiment the original version of Porter's stemming algorithm available in the public domain at University of North Carolina is used. In other embodiments, other stop word lists and stemming algorithms can be used, such as for example, brute force, suffix/affix stripping, lemmatization, stochastic, and combinations thereof.

After data pre-processing is complete, the control shifts back to the meta-clustering and comparison search tool 32, which dependent on the search mode selected by the user, then passes the pre-processed data on to a respective processing module, either a quantitative evaluation search interface 46 for the QE search mode, or a comparative web search interface 48 for the DQ, DT, DE, DD, DC, DB search modes. In the case for the QE search mode, if the user selected the "Show Results in Ranked Lists" option in the choice of clustering technique drop down box provided by the advance option in the search-specific parameters section (pane) 30 of the UI 22 for the QE search mode, once the raw data is pre-processed, the pre-processed data is sent to a results presentation module 50 and presents this data as the retrieved search results to the user without any further processing. In all the other choices of clustering techniques, the quantitative evaluation search interface 46 uses the follow processes: keyword selection 52, base cluster formation 54, label enhancement 56, sub-clustering 58, and snippet evaluation 60. Heuristics for these processes are explained hereafter in later sections. After meta clustering and the quality of the web snippets retrieved from the selected search engine is determined, the search results are then sent to the results presentation module 50 and presented to the user on the UI 22 via the CGI script. Examples of the various presentations of search results using the options under the QE search mode and provided by the presentation module 50 are shown by FIGS. 9, 10, and 11, which are discussed briefly hereafter.

Figure 9:
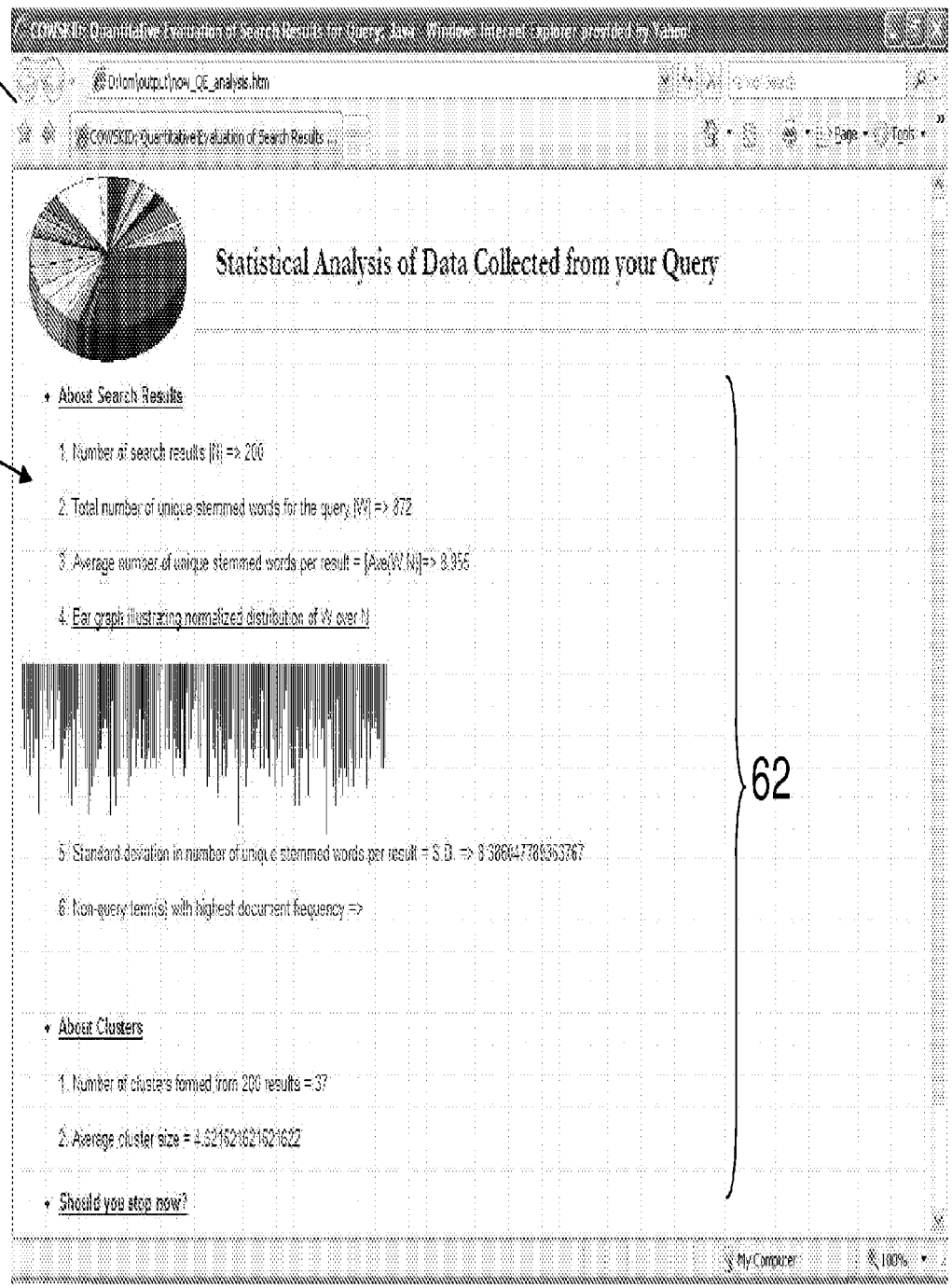
FIG. 9 shows an example of a screen display on a user interface which displays evaluation of several quantitative parameters to determine the quality of web snippets retrieved from generic web-based search engine using a system according to present disclosure.

FIG. 9 shows an example of a screen display on the UI 22 which displays a quantitative evaluation 62 of several parameters to determine the quality of web snippets retrieved from generic web-based search engine using the system 10 according to present disclosure. A detailed discussion on the algorithm and the several parameters used and displayed in the UI 22 for the quantitative evaluation 62 is provided hereafter in a later section.

Figure 10:
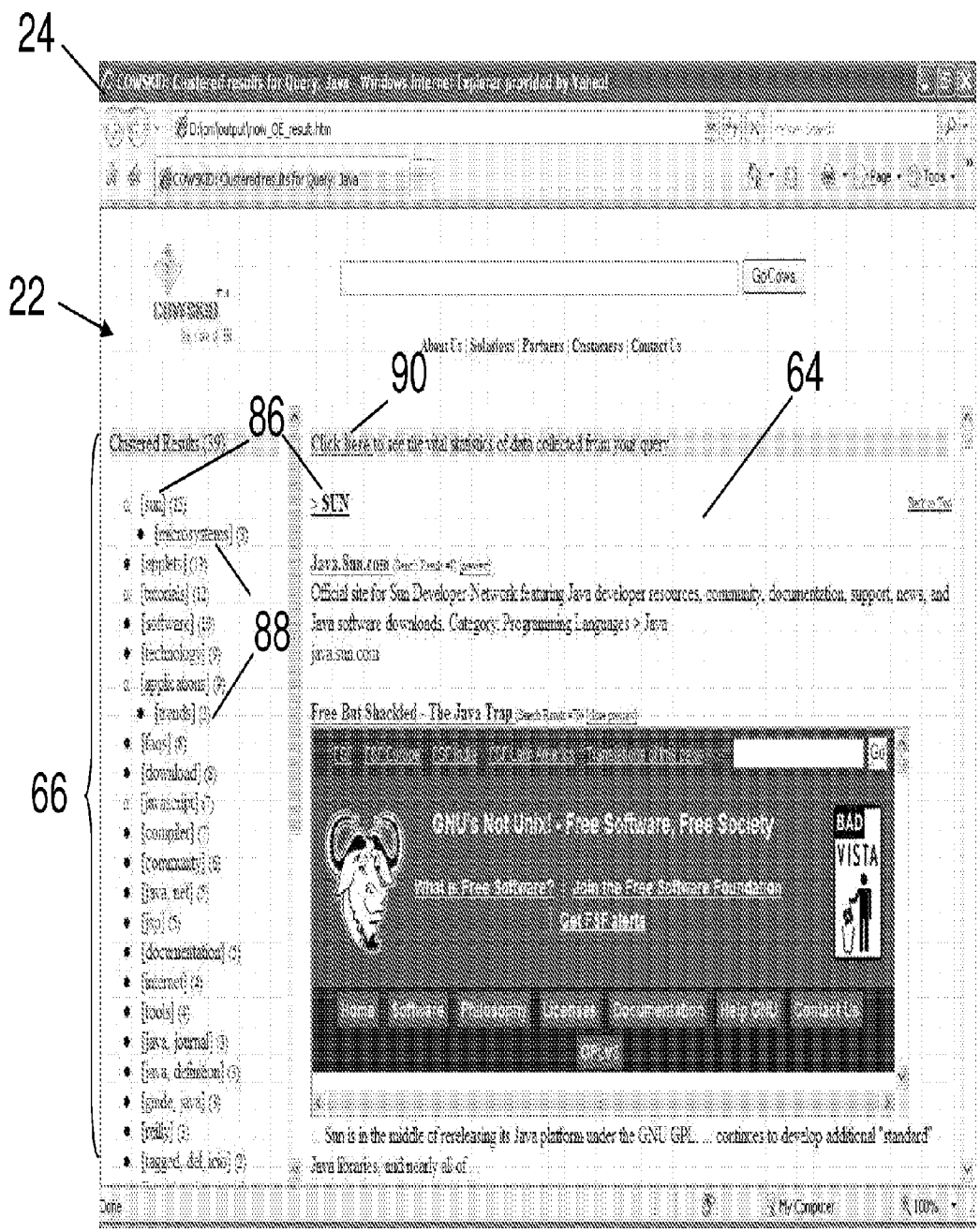
FIG. 10 shows an example of a screen display on a user interface which displays the search results in hierarchical clusters per user preference when using the search mode for evaluating snippet quality.

FIG. 10 shows an example of a screen display on the UI 22 which displays the search results, generally indicated by symbol 64, in hierarchical clusters per user preference (i.e., labeled hierarchical clusters 66 when using the QE search mode for evaluating web snippet quality. A detailed discussion on the algorithms used to provide the search results 64 and labeled hierarchical clusters 66 displayed in the UI 22 is provided hereafter in later sections.

Figure 11:
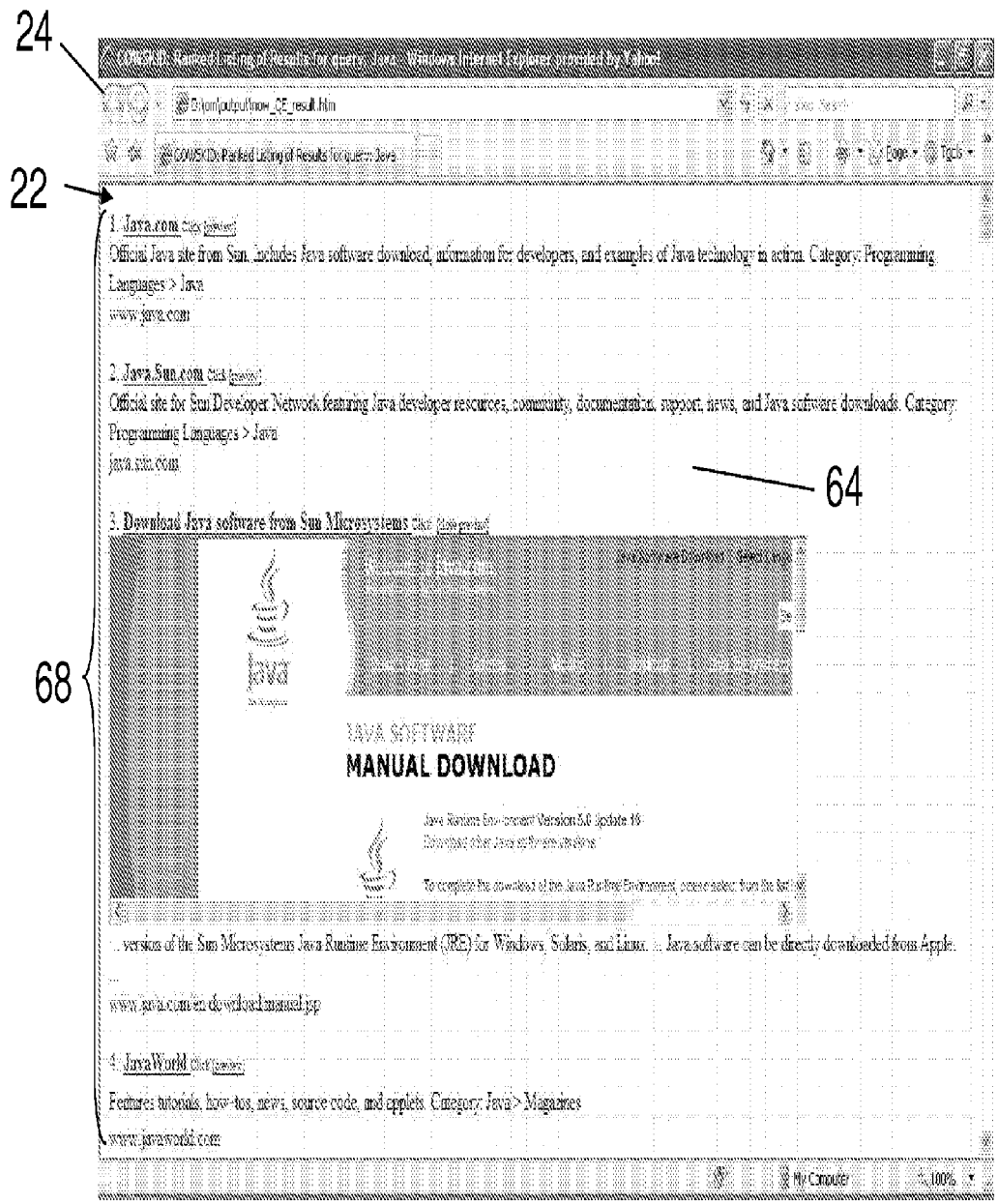
FIG. 11 shows an example of a screen display on a user interface which displays the search results in ranked lists per user preference when using the search mode for evaluating snippet quality.

FIG. 11 shows an example of a screen display on the UI 22 which displays the search results 64 in ranked lists 68 per user preference when using the QE search mode for evaluating web snippet quality. A detailed discussion on the algorithms used to provide the search results 64 and rank lists 66 displayed in the UI 22 is provided hereafter in later sections. The following discussion hereafter continues the description of the anatomy and workings of the system 10 according to the present disclosure with reference made once again to FIG. 1.

In the case of user selecting one of the DQ, DT, DE, DD, DC, DB search modes, the comparative web search interface 48 will receive the pre-processed data from the data pre-processing module 34 and select the appropriate comparison performed by a comparison engine 70 on the pre-processed data. The comparisons that may be performed by the comparison engine 70 are a thematic level comparison 72, an objection level comparison 74, and a result sets comparison 76. It is to be appreciated that all thematic level comparisons regardless of the search mode selected follow the procedure described hereafter.

For the thematic level comparison 72 each participating result set is transformed into a set of base clusters. These base clusters comprise of only two components: cluster title and cluster result list. Cluster title consists of the most suitable keywords selected from the abstract and/or title of the returned web snippets. Results with no potential keywords are categorized into a special cluster and they are not considered for further processing. The cluster result list stores the original ranks of results categorized in that cluster. The term "original rank" of a result refers to the rank assigned to a web document by a generic web search engine from which the result was retrieved.

In the first step of the thematic level comparison 72, the base clusters in any given cluster set with complete overlapping titles (same set of words in the titles) are merged together to form homogeneous clusters. A homogeneous cluster comprises of results retrieved from one generic search engine. After this process is iterated for every base cluster set, a comparison between different base cluster sets is initiated to form heterogeneous clusters as the second step. A heterogeneous cluster comprises of results retrieved from more than one generic search engine. Once again, clusters with complete overlapping titles are merged.

Next, the process of the thematic level comparison 72 is followed by merging of clusters with maximum overlapping titles as a third step. When there is tie between three clusters A, B and C such that the number of keywords common to A and B is the same as C and A then a set of rules (explained hereafter in a later section) are followed to break the tie. Note that when a base cluster from one set is merged with another base cluster from different set, the title of resultant cluster is intersection of participating cluster titles while resultant cluster result list is the union of participating result lists. All the results that are categorized in heterogeneous clusters are removed from homogeneous clusters.

For instance, if the result list of a homogeneous cluster is (1, 45) and if result 1 appears in a heterogeneous cluster, then the new result list of the homogeneous cluster would simply consist of result 45. If both results 1 and 45 were categorized in heterogeneous clusters then the homogeneous cluster would be dissolved. When no further clustering is possible, all the clusters formed are sent to the label enhancement module where the raw data obtained from generic search engines is used to enhance cluster titles. Both homogeneous and heterogeneous clusters are presented in separate files.

Figure 12:
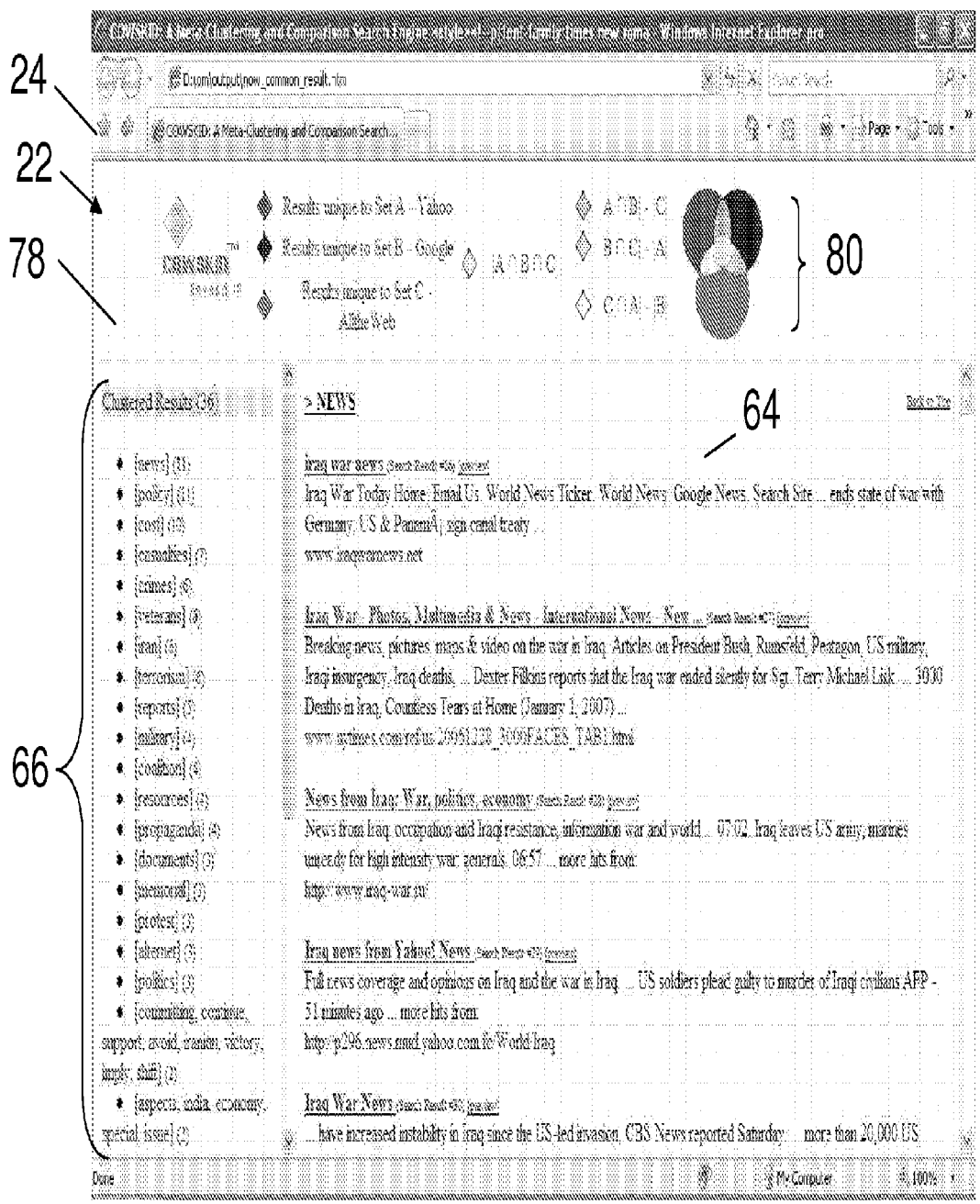
FIG. 12 shows an example of a screen display on a user interface which displays the search results for thematic level comparison between three results sets.

The cluster titles of homogeneous clusters represent themes that are unique to one result set while the cluster titles of heterogeneous clusters represent themes that are common to both participating result sets. In essence, (A∩B) means themes common to both A and B, (A−B) means themes unique to set A, and (B−A) means themes unique to set B. Here, A and B represent distinct sets of base clusters generated from result sets retrieved from generic web search engines. The process described above summarizes a comparative web search at a thematic level between two result sets. In case of three result sets, the procedure remains the same as described above except that, during the clustering phase, the comparison is performed in the following order to provide a summarized comparative web search. In such an example, (A ∩ B∩C) means themes common to all the sets, (A∩B)−(C) means themes common to sets A and B but not C, (B∩C)−(A) means themes common to sets B and C but not A, (C∩A)−(B) means themes common to sets C and A but not B, (A)−[B+C] means themes unique to A, (B)−[A+C] means themes unique to B, and (C)−[A+B] means themes unique to C. FIG. 12 shows an example of a screen display on the UI 22 which displays the search results for a thematic level comparison 78 between three results sets and providing the summarized comparative web search 80 as described above in the form of a Venn diagram.

When the comparison engine 70 performs the object level comparison 74 (FIG. 1) on the result sets, URLs become the key factors in differentiating the results. Although the hereafter disclosure only mentions object level comparisons between 2 and 3 result sets, this capability can be easily extended to n sets. It is also to be appreciated that the following disclosed procedure for the object level comparison 74 remains the same regardless of search mode.

The first step in object level comparison is URL pre-processing. Just like data pre-processing, URLs also need to be pre-processed as different search engines present URLs differently. In one embodiment, "http" and "www" tags are removed. Often, the same IP addresses are represented by syntactically different URLs, for example "mail.yahoo.com" and "http://www.mail.yahoo.com/". Next, the "/", "?" and other symbols are removed if they appear at the end of the URL. Again, although the following URLs, for example, share a common IP address, they are syntactically different: "www.cs.wrightedu/~hlagad/" and "http://www.cs.wright.edu/~hlagad". Lastly, if the URLs are too lengthy, the generic search engines often tend to abridge them by replacing the remainder of URL by " . . . ". For example, "oraclepartnernetwork.oracle.com/portal/page . . . &_dad=moc&_schema=MOC" and "topics.nytimes.com/top/news/international/countriesandterritories/ . . . ". In such cases, URLs are shortened to the part prior to " . . . ". After all the URLs are pre-processed, via the data pre-processing module 34, each result set is examined separately to find duplicate results.

After removing the duplicates, each result set is compared to every other set to find common results. In the example provided hereafter, a three result sets object level comparison is disclosed. It is as follows, where R1, R2 and R3 is three sets of results that need to be compared at the object level. In other words, R1 is compared to R2 to derive (R1∩R2). Later, (R1∩R2) is compared to R3 to form (R1∩R2∩R3). At this stage, all the results R1, R2 and R3 are unchanged. Note that duplicate results in (R1∩R2∩R3) are eliminated. Once the results common to all the sets are collected, all the common results are removed from each original set. In other words, R1'=R1−(R1∩R2∩R3), R2'=R2−(R1∩R2∩R3) and R3'=R3−(R1∩R2∩R3) replace R1, R2, and R3 respectively.

In case of object level comparison between two sets, once R1', R2', and (R1∩R2) are determined, the process is terminated. In case of three sets, the comparison engine 70 continues performing the following steps. Now R1' and R2' are compared to form R1", R2" and R1'∩R2'. Similarly, R2" and R3' are compared to form R2'", R3" and R2"∩R3'. Finally, R1" and R3" are compared to form R1'", R3'" and R1"∩R3". Note that R1'" represents the set of results uniquely found in R1. Similarly, R2'" and R3'" represent set of results uniquely found in R2 and R3 respectively. Obviously, (R1∩R2∩R3) is the set of results found in R1, R2 and R3. R1'∩R2' represents set of results found in R1 and R2 but not R3. Similarly, R2"∩R3' and R1"∩R3" represent set of results found in R2 and R3 but not R1, and R1 and R3 but not R2 respectively.

Figure 13:
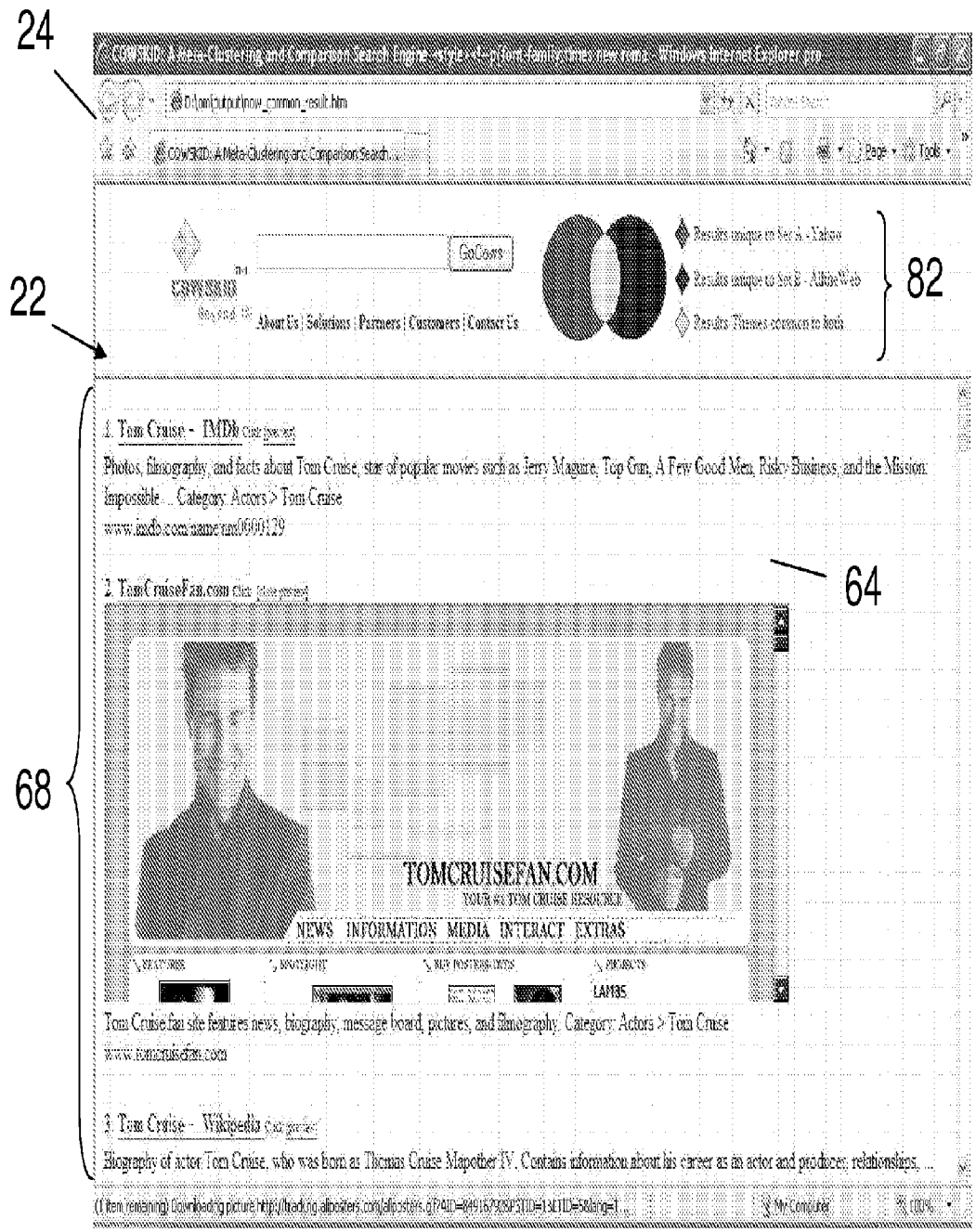
FIG. 13 shows an example of a screen display on a user interface which displays the search results for object level comparison between two results sets.

In essence, if three result sets are compared then following measures are derived: (R1∩R2∩R3)—results common to all the sets; (R1∩R2)−(R3)—results common to sets R1 and R2 but not R3; (R2∩R3)−(R1)—results common to sets R2 and R3 but not R1; (R1∩R3)−(R2)—results common to sets R1 and R3 but not R2; (R1)−(R2+R3)—results unique to R1; (R2)−(R1+R3)—results unique to R2; and (R3)−(R1+R2)—results unique to R3. Naturally, the comparison between two result sets will yield the following measures: (R1∩R2)—results common to R1 and R2; (R1−R2)—results unique to R1; and (R2−R1)—results unique to R2. FIG. 13 shows an example of a screen display on the UI 22 which displays the search results 64 in ranked lists 68 per user preference and the object level comparison 82 between two results sets in the form of a Venn diagram.

Figure 14:
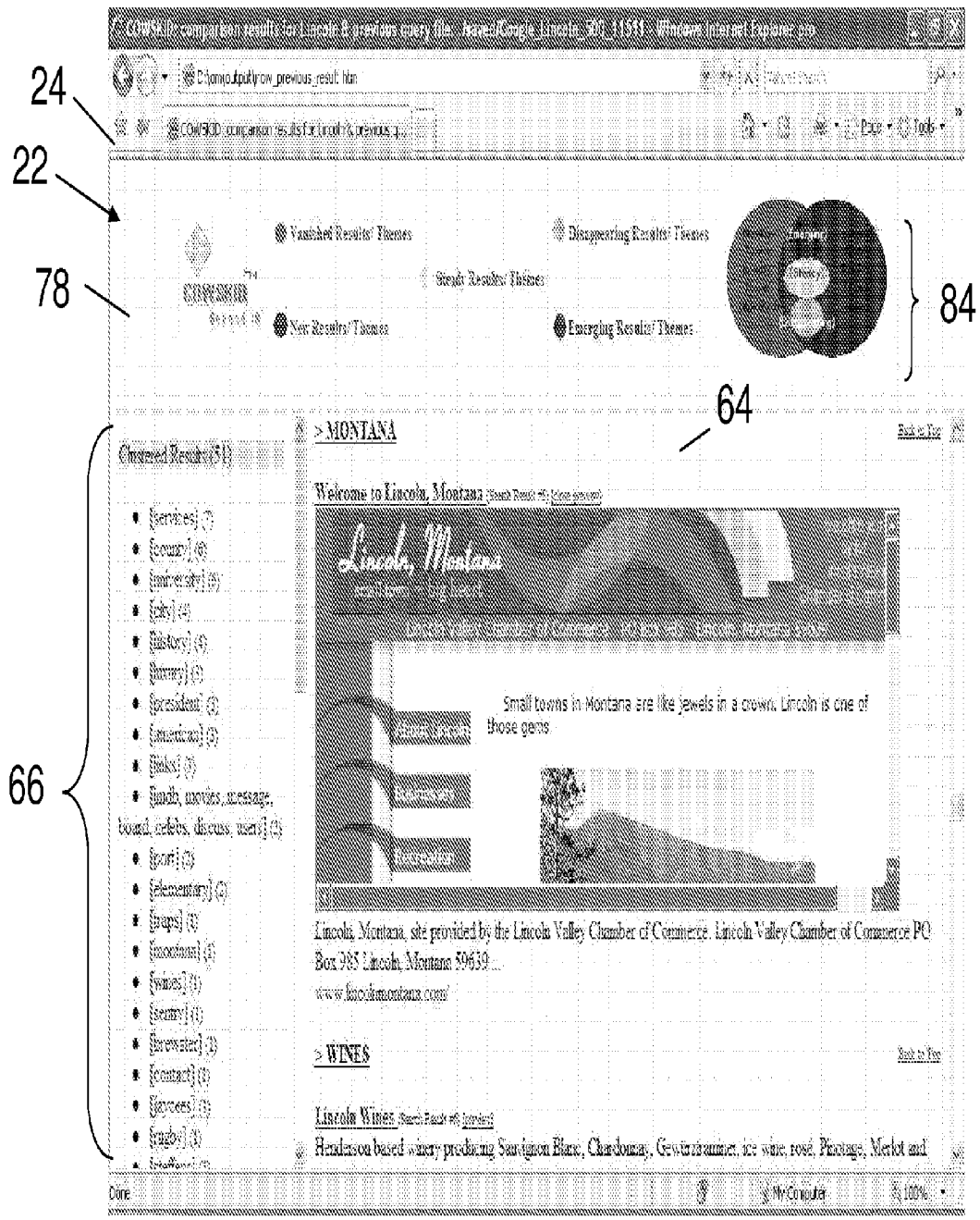
FIG. 14 shows an example of a screen display on a user interface which displays the comparative summarization of two results sets collected from generic search engines in response to a common query performed at different intervals of time conducted using a system according to the present disclosure.

The result set comparison is performed by the comparison engine 70 in the case of selecting the DT search mode. FIG. 14 shows an example of a screen display on the UI 22 which displays the search results 64, labeled hierarchical clusters 66, and a result set comparison 84 of two results sets collected from generic search engines in response to a common query performed at different intervals of time. The result set comparison 84 in the form of a Venn diagram provides a visual indication to the user on the UI 22 of vanished results, new results, steady results, emerging results, and disappearing results. In the comparison between two result sets, referred to as A and B, where A and B are respectively the result for the old/new time point if one is comparing two search results of a given query over two time points, the above mentions result sets are yielded as follows. Vanished Results are the results uniquely found in result set A; and New Results are results uniquely found in result set B. Steady Results are the results found in both result sets at approximately same ranks, which in one embodiment, are the results whose rank differ by less than e.g. 10% of total number of results retrieved. Emerging Results are the results found in both result sets where the rank of the result in result set B is higher than its rank in result set A, which in one embodiment is by more than e.g. 10% of total number of results retrieved. Disappearing Results are the results found in both result sets where the rank in result set A is higher than its rank in result set B, which in one embodiment is by more than e.g. 10% of total number of results retrieved. Generally features and layout of the UI 22 are now discussed hereafter.

In the illustrated embodiments, all the results from meta-search engine are presented to the user in HTML format, however, in other embodiments, other markup languages may also be used. If the user selects "Show Results in Ranked Lists" option in the QE search mode or if an object level comparison is made, then a result page of the UI 22 is divided into two horizontal frames. The top frame is a header page that lists various options available to the user for the search mode conducted. The bottom frame lists actual results as they appear on generic search engine(s). On the other hand, if 'QE' with clustering option or a thematic level comparison is performed, then the result page of the UI 22 is divided into three frames. The top frame still remains the same (as in case of object level comparison) but the bottom frame is divided into two vertical frames. The left frame displays cluster labels or themes while the right frame presents actual results. Application specific details are listed below.

In case of 'QE', the top frame is simply a 'QE' form since no other options are available for this search mode. When one of the clustering options is selected the results are presented in hierarchical clusters 66, as shown, for example, by FIG. 10. Cluster labels 86 are presented in the left frame and when selected point to a corresponding clusters in the right frame of the provided search results 64. A user can distinguish between a cluster with sub-clusters 88 and one without them by looking at an alpha symbol "α" placed before the respective cluster label 86. If a cluster does not have any sub-clusters then a black dot is placed instead. The user can browse subclusters of a parent cluster by clicking, the alpha symbol. At the top-left corner of the right frame, a link 90 to the quantitative evaluation file for the web snippet quality collected from the generic search engine is presented. Clicking on the link will open a new window or tab presenting the quantitative evaluation 62 as shown for example by FIG. 9.

In case where the user selects the non-clustering option to perform his/her query then the results are presented in the same ranked listing as they appear on generic search engine in the UI 22. In one embodiment, instead of listing only a selected number of result (e.g., 10, 20, 30, etc.) at a time, all the results retrieved from search engine are presented at once. This approach, which is shown, for example, by FIG. 11, is useful in making up for the time loss during initial response.

When a comparison is performed between two result sets (regardless of search mode), the top frame of the result file presents the following options: results/themes common to all participating search engines, and the list of results/themes uniquely found in each one of the result sets as is shown for example, by FIG. 13. Similarly, when a comparison is performed between three result sets (regardless of search mode), the top frame of the result file presents following options: results/themes common to all participating search engines, the list of results/themes uniquely found in each one of them, and the list of results/themes found uniquely common in two result sets but not the third one, as is shown, for example, by FIG. 12.

The result presentation for the DT search mode is identical to other search modes with one key difference. The header file shown in top frame presents a completely new set of options to the users. These options are more interesting because they show the common results/themes in more intricate form, as sown by FIG. 14, includes the common results/themes that are emerging, disappearing or remaining steady as discussed above in a previous section. After understanding the anatomy and working of the system 10 according to the present disclosure, the following sections describe the methods and algorithms for providing the features mentioned above.

Algorithm for Keyword Selection.

Let R be a set of all the results (consisting titles, snippets and URLs) returned from a search engine. Let W be all the words (in title and snippets) in R, w be any word in W and r be any result in R. Note that URLs are not used in text clustering. The data collected is refined by removing stop words and very frequently occurring words (words appearing in more than 25% of results). Further, the words are stemmed using Porter's algorithm. After data-preprocessing, each result can be viewed as a bag of words B'[r]. Note that B'[r] is the union of WT[r] and WS[r], where WT[r] is a set of stemmed words in the title of r while WS[r] is the set of stemmed words in the abstract of r. Finally, let B[r]=(B'[r]–duplicates). B[r] is a set of unique stemmed words that do not appear in stop word list. Let b be any word in B[r].

An integer value v between (3–0) is assigned to b depending on the criteria explained below. Higher value of v indicates better candidacy of the keyword. Term frequency of b in r is denoted by f[b,r], where f [b,r]=(# of occurrences of b in r)/|B'[r]|. Once the term frequencies of all words in B[r] are calculated, find the average frequency of B[r] denoted by f [B,r], where [B,r]=(Σf [x,r])/|B[r]| where x ranges over B[r]. Therefore, 0 [if {f [b,r]<=(1.5*f [B,r])} and b appears only in WS (r)], where v (b,r)=1 [if {f [b,r]>(1.5*f [B,r])} and b appears only in WS (r)], 2 [if b appears only in WT (r)], and 3 [if b appears in both WT (r) and WS (r)].

Value '0' is assigned to words uniquely found in WS (r) and with frequencies lower than or equal to (150%) of the average frequency of all the words appearing in r. Similarly, '1' is assigned to the words uniquely found in WS (r) and with frequencies more than (150%) of the average frequency. Value '2' is assigned to the words uniquely found in WT (r) regardless of their term frequencies. Finally '3' is assigned to the words that appear in both WT (r) and WS (r) regardless of their term frequencies. Inventors of some related previous technologies emphasize that terms with mid frequencies are often most meaningful terms in a document. However, when using snippets instead of entire documents for clustering results, words with higher term frequencies have greater influence on the meaning of the result than the words with mid or lower term frequencies.

After assigning v to every b in r and for all r in R, each r can be viewed as a composition of two sets of words: h [r] and l [r]. h [r] is a set of all terms in r with highest candidacy for categorization while l [r] represents the set of terms with lower candidacy. Assuming |r|=3, v (b1,r)=1, v (b2,r)=2, and v (b3,r)=0, then only b2 will be assigned to h [r]. Both b1 and b3 will be assigned to l [r]. If there is an additional term b4 with v (b4,r)=2, then both b4 and b2 will be assigned to h [r].

Conversely, if |r|=1 and v (b1,r)=0 then b1 will be assigned to h [r]. The terms in h [r] become the keywords for result categorization. On the other hand, the terms in l [r] can be viewed as repository terms that may get transferred to h [r] if the existing members of h [r] are not sufficient for result categorization. Terms in l [r] are transferred in batches depending on the v value. In other words, if the v value of all the terms in h [r] is 3 and somehow these terms cannot get result r categorized, then all the terms in l [r] with v (b,r)=2 will be transferred to h [r]. The batch transfer approach provides the terms with similar term frequencies an equal opportunity to become the key candidate term in result categorization.

In case of "Use TF-IDF Scoring Mechanism," a clustering option in the QE search mode, TF-IDF score instead of v value is used for sorting candidates between h [r] and l [r]. In this case, only one term with the next highest TF-IDF score is transferred from l [r] to h [r]. Note that if document frequency of b is 1, it will not be assigned to h [r] or l [r]. In other words, if a term appears in only one result, it will not be considered for clustering process. The formula for TF-IDF is as follows:

$$tf = \frac{n_i}{\sum_k n_k} \quad tfidf = tf \cdot \log\left(\frac{|D|}{|(d_j \supset t_i)|}\right)$$

where $n_i$ is the number of occurrences of the considered term, $\Sigma_k n_k$ is the number of occurrences of all terms and $|D|$ is total number of documents in corpus, and $|(d_j \supset t_j)|$ is the number of documents where the term $t_j$ appears.

In addition, the query terms are not considered for the clustering process and are also removed from B[r]. However, they are re-introduced during cluster labeling. Hence, the modified version of TF-IDF scoring employed by "Optimal Clustering" and "Cluster with Maximum Accuracy" clustering options of the QE search mode, lays emphasis only on term frequency and partially takes the IDF factor into consideration by eliminating words with high document frequencies. Since words with document frequency 1 cannot be useful in clustering based on lexical connections, they too are eliminated.

Preliminaries for Cluster Formation.

Let C represent the entire set of clusters formed from R and c be any cluster in C, where c has three attributes: title (c [T]), result set (c [R]), and sub-clusters (c [S]). The Result Set is a list of results categorized in cluster c. The Sub clusters is A sub hierarchy rooted at this node in the categorization tree. Title thus comprises selected term(s) found common in all the results in c [R]. The selection of terms is influenced by the criteria mentioned above.

Algorithm for Base Cluster Formation.

The clustering approach employed by the system according to the present disclosure is bottom-up hierarchical clustering. First, the result set R is divided into three fragments R1, R2 and R3. R3 comprises of the results that are devoid of data and therefore cannot be categorized to any cluster. Results in R3 are assigned to a special cluster called "Non-Clusterable Results." c [T] for this cluster is "Non-Clusterable Results", c [R]=R3=all the results where |h [r]|=|l [r]|=0 and c [5]=null. Results in this cluster are not processed any further. They are presented with other results after all the processing is complete. A subset of results where all the terms have v (b,r)<1 is denoted by R2. Let BC2 denote the set of base clusters formed from R2. The results in the third fragment, denoted by R1, are a subset of results with at least one term having v(b,r)>0. The set of base clusters formed from R1 is denoted by BC1. Note that R=R1 union R2 union R3, R1∩R2=R2∩R3=R3∩R1=null, and BC=BC1 union BC2 union "Non-Clusterable Results" where, BC is a set of all base clusters formed from R.

Algorithm for Cluster Formation.

Clustering process in the system according to the present disclosure is purely based on lexical connections between the cluster titles. Note that cluster title is not the title of a result as seen on web but a few keywords selected from bag of terms associated with that result. The clustering of results takes place in two phases: C1 is formed from BC1, and BC2 is introduced to C1 to form C1'. This phase would be omitted if the user selects "Maximum Accuracy" option in 'QE'. In that case, the base clusters in BC2 are presented as subclusters of a special cluster named "User Discretion Required." The attribute values of this special cluster are as follows: c[T]= "User Discretion Required," c[S]=BC2 and c[R]=null. In other words, for "Maximum Accuracy" option in 'QE', BC2=c[S] of "User Discretion Required" and C=C1 union "User Discretion Required" union "Non-Clusterable Results" where, C is a set of all clusters formed from R.

First Phase of Cluster Formation.

The procedure for clustering in this phase is as follows. First, combine the base clusters in BC1 that have identical cluster titles. Let c1 and c2 be two base clusters with identical titles (c1 [T]=c2 [T]). The resultant cluster c1' formed by the fusion of c1 and c2 will have following properties. c1' [T]=c1 [T], c1' [R]=c1[R] union c2 [R] and c1'. [S]=c1 [S] union c2 [S]. The same rule is applied to all successive mergers of clusters with identical cluster titles. Second, combine clusters with partial overlap in cluster titles. An overlap in titles implies there exist terms common to the titles of the participating clusters. Clusters with largest overlap are merged. Consider three clusters c1, c2 and c3. Say there is an overlap of two terms between (c1, c2) and an overlap of 3 terms between (c2, c3). In this case, c2 and c3 are merged together such that c2' [T]=c2 [T] c3 [T], c2' [R]=c2 [R] union c3 [R] and c2' [S]=c2 [S] union c3 [S]. Both c2 and c3 are removed from C1 and c2' is inserted. Once again, the same rule is applied to all successive mergers. However, if there is a tie such that the overlap between (c1, c2) and the overlap between (c2, c3) is the same number of terms then the following set of rules are applied to break the tie.

For the following discussion, suppose t1 and t5 are terms in ci for i=2,3, and t1 and t2 are terms in cj for j=1,2. Let S1=f [c2,t1]+f[c2, t5]+f[c3,t1], f[c3,t5] and S2=f[c2,t1]+f[c2,t2]+f[c1,t1]+f[c1,t2] where the general form f[c,t] represents the term frequency of the term t in all the results in cluster c. S1 and S2 are the scores generated by the cumulative sum of all such frequencies. Thus, first, the scores S1 and S2 are compared. The higher score breaks the tie. If the frequency scores are unable to break the tie then the tool 32 checks if there is a "submersion" of one title into another. In other words, c1 [T] can be "submersed" in c2 [T] if c1 [T] is a proper subset of c2 [T]. If c1 can be submersed into c2 then the new cluster c1c2 will have the following properties: c1c2 [T]=c1 [T], c1c2 [R]=c1 [R] union c2 [R] and c1c2 [S]=c1 [S] union c2 [S]. If this technique also fails in breaking the tie (if both c1 and c3 can be submersed in c2 or none of them can be submersed) then no merger takes place and all three clusters are considered individually in phase two. C1 is the set of all clusters formed from BC1 in this phase. Note that there may be some clusters in C1 such that |c [R]|=1. These clusters may merge with other base clusters in BC2.

Second Phase of Cluster Formation.

In this phase, the base clusters in BC2 are introduced to the clusters in C1. Once BC2 is introduced to C1, BC2=null. The clustering procedure in this phase is as follows. Same as first phase but when a new cluster, say E, is formed by merger of two clusters, say E1 and E2, then E [T]=E1 [T]∩E2 [T], E [R]=E1 [R] union E2 [R], and E [S]=E1 [S] union E2 [S]. Also, E1 [T]=E1 [T]–E [T] and E2 [T]=E2 [T]–E [T]. Although E is inserted in C1', E1 and E2 are not eliminated. The tool 32 does not remove E1 and E2 because base clusters in BC2 are noisy, and therefore can be categorized to several clusters. All c in C1' such that |c [R]|=1 are processed for generalization of cluster titles. The base clusters in C1' that could not be merged with other clusters due to uniqueness of the existing terms in their titles are considered for generalization. In order words, more terms are transferred from l [r] to h [r] of the result r in c [R]. Since, c [T] for base cluster=h [r] of the result r, more terms are added to the titles of this base cluster. This process aids in clustering more results but lowers the precision of clustering algorithm. ("Optimal Clustering" and "Use TF-IDF Scoring Mechanism" options in 'QE' employ this method). Repeat above steps until no further clustering is possible. Remove all c in C1' such that |c [R]|=1 and insert these base clusters back into BC2. Once again, base clusters in BC2 are transformed into subclusters of "User Discretion Required" cluster, and C=C1' union "User Discretion Required" union "Non-Clusterable Results" where, C is a set of all clusters formed from R.

Algorithm for Expressive Cluster Labeling.

C has all the clusters that can be possibly formed from R. The results that can not be clustered are assigned to special clusters—"User Discretion Required" and "Non-Clusterable Results". However, the tool 32 does not consider these two special clusters for cluster labeling and sub-clustering stages. Hence, only the clusters in C1' or C1 are processed depending on user's clustering preference.

Several string searching algorithms such as PATRICIA and Suffix Tree Clustering can be employed to find long sentences common to two or more documents. These algorithms often generate clusters with sentence-like cluster labels that can be easily interpreted by the users. However, the inability of Grouper™ and other similar tools that employ such string searching algorithms to cluster together the results with different syntactic statements sharing a common meaning. For this reason, the present disclosure uses "bag of words" technique for keyword selection and clustering results. But this technique yields clusters with poor cluster labels. In order to make cluster labels more expressive, the system according to the present disclosure implements the following steps.

Consider these parameters for the following discussion. Let c denote a cluster in C1' with c [R]={r1, r2, r3, r4}. c [T] represents the cluster title of c that needs to be made more expressive. Let's call the resultant title c' [T]. Reorganize r1, r2, r3 and r4 to their base cluster form as described earlier. Let c1, c2, c3, and c4 be the respective base clusters generated. Their respective cluster title are named c1 [T], c2 [T], c3 [T], c4 [T]. The base cluster c1 is considered only if all the terms in c [T] appear in c1 [T]. Same selection criterion is applied to other base clusters. Suppose, all the base clusters except c2 qualify against this rule, then c2 is not considered any further. Find all the terms common to c1 [T], c3 [T] and c4 [T]. These terms may include stop words, query terms and articles that were dropped during cluster formation. Let S be the set of all common words. If |S|>|c [T]| then c [T]=S and terminate the process else continue performing the following steps. Find at least two base clusters, say c1 and c3, with maximum overlap between their titles. Combine c1 and c3 to form a bigger cluster c1c3 and combine c3 and c4 merge to form c3c4. If |c1c3 [T]|>|c3c4 [T]| and c [T] is a subset of c1c3 [T] then c [T]=c1c3 [T]. If there is a tie such that c [T] is a subset of both c1c3 [T] and c3c4 [T] and |c1c3 [T]|=|c3c4 [T]| then the tool 32 chooses one cluster title arbitrarily. On the other hand, if none of the clusters qualify then c [T] remains unchanged.

The above mentioned algorithm is able to generate good labels for the clusters comprising of results that contain distinctive keywords in their abstracts. It should be noted that the algorithm may fail to generate expressive labels for the clusters with noisy results, as expected. In essence, the end product of algorithms employed in cluster formation and cluster labeling stages sum up to the following: clusters comprising of ambiguous results will have poor labels while clusters with high coherence will have more expressive labels.

Algorithm for Generating Cluster Hierarchies.

A cluster in C1' is considered for sub-clustering only if |c [R]|>2. Consider a cluster c in C1' with three results: r1, r2, and r3. Just like the base cluster formation explained earlier, r1, r2, and r3 form their own clusters c1, c2, and c3 respectively. These clusters are stored in c [S]. In addition to query terms, rare terms, and very frequently occurring terms, the terms in the title of cluster c are also not considered for labeling c1, c2 and c3. This step prevents the sub-clusters from sharing the same title as their parent clusters. The grouping of c1, c2, and c3 is performed in the same way as in second phase of the clustering algorithm explained earlier. However, instead of assigning the clusters with only one result to a special cluster the tool 32 simply dissolves them and add their results to the result list of the parent cluster. Finally, the sub-clustering process is recursive. The recursion stops when no cluster inside a parent cluster qualifies for sub-clustering.

Algorithm for Quantitative Evaluation of Data Retrieved.

Once all the data processing (data collection, data-preprocessing, keyword selection, cluster formation, cluster labeling and sub-clustering) is complete, a quantitative evaluation of web snippets collected from a generic search engine is initiated. The values measured as a part of this evaluation as shown in the quantitative evaluation 62 in FIG. 9 are as follows. Under the section entitled "About Search Results," the value |N| is the number of search results retrieved in response to a user query from a generic search engine. The value |W| is the total number of unique words collected after removing stop words and applying Porter's stemming algorithm on N. This value denotes the size of dataset. Ave [W, N] Average number of unique stemmed words per result in N. This value gives user an idea of how many terms per result are available for keyword selection. The bar graph (item 4 in FIG. 9) exemplifies the normalized distribution of W over N. The Standard Deviation σ in number of unique stemmed words in a result in N illustrates irregularities in the web snippet quality in a result set, and is computed according to the follow equation:

$$\sigma = \sqrt{\frac{1}{N}\sum_{i=1}^{N}(x_i - \bar{x})^2}$$

where, $x_i$ denotes number of unique words in result i and i ranges over N. The average value $\bar{x}$=Ave[W,N]. This parameter may be more useful to search engine companies or web analysts that are keen to evaluate snippet quality of results returned by search engines. The Non-query term(s) with highest document frequency−max(df), reveals the terms in W that are very closely related to the query term(s) and can be very useful in query reformulation. The section entitled "About Clusters" provides an integer value which indicates the number of clusters formed from N and the average cluster size. It is to be appreciated that each cluster formed represents one distinct theme/sub-topic associated with a user query. Finally, the section entitles 'Should you stop now' provides a parameter which lists the major categories/themes found in results (N+. . . 2N) that are distinct from the themes found in results (1 . . . N) retrieved from a generic search engine in response to a user query. Note that the user specification is only for top N results but the system retrieves twice the number of results and identifies themes that are absent in top N results. Naturally, the thematic level comparison is used to identify common and unique themes. This parameter can be highly useful to the user as it guides him if he should continue examining the result set returned by a generic search engine in response to his query. The above described distinct measures sum up to present a fine depiction of input dataset collected from a generic search engine.

Scope of Dataset Used in Present Disclosure.

The present disclosure uses snippets instead of entire documents as input data. However, there are some limitations that need to be addressed when processing snippets. Snippets come in three different flavors in terms of quality. The first category consists of "high-quality snippets" that are informative and consist of distinctive keywords. The next class of snippets, called "average-quality snippets," represents majority of query results generated by search engines. These snippets are generally rich in data but they lack good keywords. In essence, their abstracts are descriptive but noisy, a fact which makes them difficult to cluster. In addition, when dealing with noisy data it is tricky to assign higher weights to appropriate candidate terms. Finally, the snippets in the third category called "low-quality snippets" are either devoid of data or comprise of a few rare terms, making them impossible to cluster. The present disclosure filters out such results and places them in a special "Non-Clusterable Results" category prior to clustering the remaining results. The diversity in the quality of snippets retrieved from search engines may be due to the vast distinction between web authors' style, organization and presentation. This diversity in quality causes irregularities in processing snippets.

Challenges in Text Clustering.

In addition, text clustering has its own limitations that make web document clustering even more challenging. Most text clustering algorithms use lexical connections and term frequencies to select keywords that are used for clustering results. The main problem with this approach is that it does not take into consideration the semantic relations between words. As a result, the following statements may be clustered in the same category even though they have completely different meanings: "The branches of that mango tree are very strong" and "Considering the strong performance of regional branches of Key Bank in Ohio, all of their employees will be given 5% raise in salary." On the other hand, statements such as "Bengals are very likely to win the Lombardi trophy this year" and "Cincinnati's football team has a decent shot at the cup this season," may end up in different clusters because they lack lexical connection. In order to improve the accuracy of text clustering algorithm, it is important to consider all the factors involved including lexical, syntactic and semantic. However, when several factors influence the clustering of results, the response time rises exponentially and its feasibility for web applications is questioned. Due to these reasons, the system 10 according to the present disclosure continues to employ frequency-based algorithm to cluster web search results that accomplishes the task with fair accuracy.

As discussed above, the present disclosure extends the capabilities of web searching and informational retrieval by providing a succinct comparative summary of search results at either the object or thematic levels. In one embodiment, the present disclosure provides a method for comparison between two or more result sets to generate a comparative summary and also a quantitative evaluation of web snippet quality in the result set. Using the present disclosure, a comparison between two (or more) result sets can be performed at the object level or the thematic level. In the object-level comparison, the URL of a search result is the key determining factor. On the other hand, in the more intricate thematic comparison, a set of keywords selected from each search result become the determining factors. Combinations of these keywords can be interpreted as themes in the set of search results. Other comparative search embodiments provided by the present disclosure are also disclosed.

For example, in one disclosed embodiment, a comparative web search according to the present disclosure provides a comparison of two (or more) result sets retrieved from a primary search engine(s) in response to two (or more) distinct queries. This form of comparative web searching can aid the user in discovering intriguing similarities in topics of online documents returned in response to the queries. In this form of comparison it is only logical to compare the result sets at thematic level since results obtained for distinct queries often consists of different web documents.

In another disclosed embodiment, the present disclosure provides a comparative web search providing a comparison of two (or more) result sets retrieved from primary search engine(s) in response to a common query performed at different points in time. This form of comparison can help the user in tracking the development in the area of interest with respect to online material. In this case, the comparison can be performed at the object level or thematic level depending on user's preference.

A third disclosed embodiment of comparative web search is comparison of two (or more) result sets retrieved from two (or more) generic search engines in response to a common query. This form of comparison can assist a user in determining results/themes common to all participating search engines as well as the results/themes unique to each one of them. By clearly separating the common results/themes from unique ones, this comparison helps the user in avoiding wasting time reading repeated materials as well as allows them to determine ranking heuristic similarity in search engines.

A fourth disclosed embodiment of comparative web search is a comparison of two (or more) result sets retrieved from primary search engine(s) in response to a common query such that each participating result set meets the following two conditions: (a) all results in a result set belong to same domain such as .com, .gov, etc.; and, (b) there is no domain similarity among participating result sets. Once again, performing an object level comparison is not applicable in this case since there cannot be two URLs leading to a single web document. Therefore, the comparison is performed only at the thematic level. This form of comparison can reveal interesting commonalities in web documents belonging to different domains but pertaining to a common topic.

A fifth disclosed embodiment of comparative web search is a comparison of two (or more) result sets retrieved from primary search engine(s) in response to a common query such that each participating result set meets following two conditions: (a) all results in a result set belong to same country; and, (b) there is no country similarity among participating result sets. In other words, the physical location of all the web documents in one result set share a common geographic origin but there is no similarity in geographic origin of results between any two participating result sets. This search mode can allow a user to study and compare trends from around the world with respect to a topic of interest.

The last disclosed embodiment of comparative web search is comparison of two (or more) segments of a result set retrieved from generic search engine in response to a query such that each segment is a subset of the result set obtained in some systematic manner. For example, the result set can be divided in equi-distant and equi-weighted manner. Equi-distant means the difference between the rank-position of any two consecutive results in a result set is constant. Equi-weighted segments means the total number of results in one segment of the query result set is equal to any other participating segment. Interesting inferences such as snippet quality deterioration and result relevance determination may be derived by such comparisons.

The present disclosure may be used with language as an element of dissimilarity to perform a comparative web search. In this case, web snippets/documents in different languages are retrieved from web-based search engines in response to a query and are translated into a user specified language. A comparison on the translated snippets/documents is then performed at the thematic level. This form of comparison can reveal ideas/themes that transcend language barriers with respect to a topic of interest.

For example and reference to FIG. 1, the following algorithm may be used to generate a comparative summary of two or more result sets retrieved from generic web search engines in response to a common query performed in different languages. First, the UI 22 receives a query inputted by a user and the meta-search engine 12 then translates the query into a selected set of languages and searches for documents on the selected set using the generic web-based search engines 14. The retrieved raw data in the form of web snippets from each member of the selected set is then forwarded to the data pre-processing module 34 to remove language-specific stop words and HTML tags, and apply language-specific stemming algorithm. Next the pre-processed data is translated via a translator 92. The translated pre-processed data is then sent to the comparison engine 70, wherein the comparison engine performs the comparison at object level or thematic level depending on user specification. As before, the comparing of two or more result sets depends on the user preference, whereby the result sets are organized in ranked lists for the object level comparison or hierarchical clusters for the thematic level comparison. Finally, the results comparison and the organized search results are outputted via the presentation module 50 to the UI 22.

The present disclosure also provides techniques to evaluate the quality of web snippets retrieved from a generic search engine in response to a query. Several quantitative measures are evaluated to determine the quality of a result set returned by a generic search engine. Such evaluation can be highly valuable to search engine companies and users alike.

The present disclosure further includes a method of performing comparative web search and obtaining results therefrom; the method provides a metasearch engine capable of accessing generic web-based search engines, and databases capable of web interface. The metasearch engine receives a query (or queries) submitted by a user and accesses web search engine(s) depending on the search mode and user preference. The raw data collected from a selected set of web search engines is in the form of web snippets, which is converted into a local format. In the case of object level comparison, the formatted raw data is pre-processed by pruning the URLs, while in the case of thematic level comparison, the formatted data is pre-processed by removing stop words and applying a stemming algorithm to the title and abstract of web snippets. The comparison between two result sets (R1, R2) yields the following sets of results: (R1∩R2) which is the results common to R1 and R2; (R1−R2) which is the results unique to R1; and (R2−R1) which is the results unique to R2. The comparison between three result sets (R1, R2, and R3) yields the following sets of results: (R∩R2∩R3), which is the results common to all the sets; (R1∩R2)−R3, which are the results common to sets R1 and R2 but not R3; (R2∩R3)−R1, which are the results common to sets R2 and R3 but not R1; (R1∩R3)−R2, which is the results common to sets R1 and R3 but not R2; R1−[R2+R3], which is the results unique to R1; R2−[R1+R3], which is the results unique to R2; and R3−[R1+R2], which is the results unique to R3.

For the object level comparison, the URL of each result in a set is compared with the URLs of all the results in the same set to eliminate duplicates. Once all the duplicates have been removed in all participating sets, inter-result set comparison begins to generate comparative summaries as described above depending on number of result sets considered. In thematic level comparison, keywords are selected from title and/or abstract of each result based on some heuristic techniques. The selected keywords represent themes of a result. All the results in every participating result set are transformed into base clusters such that each base cluster comprises of two components: cluster title, and cluster result list. During the formation of a base cluster, the selected keywords from a result form the cluster label and the rank of the result is added to the cluster's result list. Like object level comparison, base clusters are first compared with other base clusters in the same set and then with clusters in other sets. Pairs of clusters with largest overlap in cluster titles are merged, where the title of the merged cluster is a set of all keywords common to both cluster titles, and the result list is the union of all results in each participating cluster. If there is a tie then it is resolved by following a set of rules, such as discussed above in a previous section. Once again, the comparative summaries are generated based on the number of result sets considered.

The processed search results are presented in ranked lists in case of object level comparison, while thematic level comparison yields results in the form of clusters. The present disclosure also includes a method of performing quantitative evaluation of web snippet quality. The metasearch engine receives a query submitted by a user and accesses only one generic web search engine. The raw data collected from a generic web search engine is in the form of web snippets, which is converted into a local format. If the user chooses to simply view the results, then no further processing is needed and the results are presented in the original ranking order. However, if the user chooses to cluster the results and evaluate the quality of web snippets then the following procedure is performed.

First, the formatted raw data is pre-processed by removing stop words and applying a stemming algorithm to the title and abstract of web snippets. Once again, all the results are transformed into base clusters such that each base cluster has the following three components: cluster title, cluster result list, and sub-cluster list. The data structure of a sub-cluster is identical to that of a cluster. Initially, each cluster consists of one search result, where the cluster title comprises of keywords selected from that result. The rank of the result is added to the cluster result list and sub-cluster list is null. The base clusters with maximum overlapping titles are merged. If there is a tie then it is resolved by following a set of rules explained in later sections. Once all the clusters with overlapping titles are merged, they are sent to label enhancement module, which applies some heuristic to improve the quality of cluster labels.

After cluster-title enhancement, all the clusters with at least three results are considered for sub-clustering. After sub-clustering is performed on clusters (wherever possible), both the formatted raw data and clusters are considered for quantitative evaluation. Several variables, listed in later sections, are measured to determine the quality of the web snippets retrieved from a generic search engine in response to a query. Finally, the hierarchical clusters as well as quantitative measures are presented to the user.

The foregoing detailed description and embodiments therein are being given by way of illustration and example only; additional variations in form or detail will readily suggest themselves to those skilled in the art without departing from the spirit of the disclosure. Accordingly, the scope of the disclosure should be understood to be limited only by the appended claims.

What is claimed is:

1. An electronic search system for web-based search engines comprising:
   a web-enabled user interface configured to provide a search mode and to display a first result set and a second result set; and
   a processor configured to:
   receive the search mode, wherein the search mode includes the following modes:
   a comparison of the first and the second result set collected from same or different generic web search engines in response to two or more different queries,
   a comparison of the first and the second result set collected from same or different generic web search engines in response to a common query performed at different points of time,
   a comparison of the first and the second result set collected from different generic web search engines in response to a common query performed simultaneously,
   a comparison of the first and the second result set collected from same or different generic web search engines in response to a common query performed in different languages,
   a comparison of the first and the second result set collected from same or different generic web search engines in response to a common query where intra-domain similarity between results of the same set is 100% while inter-geographic origin similarity between result sets is zero, a comparison of the first and the second result set collected from same or different generic web search engines in response to a common query where intra-geographic origin similarity between results of same set is 100% while inter-geographic origin similarity between result sets is zero, and the first and the second result set retrieved from a generic web search engine in response to a query is segmented into bins of equi-distant and equi-weighted segments and the segments are compared to generate comparative summaries;

determine whether a quantitative or comparative search mode has been selected;

apply a meta-clustering tool configured to select keywords, form base clusters, enhance labels, form sub-clusters, and evaluate snippets;

apply a comparative tool configured to perform a thematic level comparison or an object level comparison, and a result set comparison; and provide the result sets to the web-enabled user interface.

2. The system of claim 1, wherein one or more terms define a search mode.

3. The system of claim 1, wherein the web-enabled user interface comprises a display with an input field configured to receive one or more terms that define a search query, or a selection of one or more generic web search engines to search, or a request for a number of results.

* * * * *

UNITED STATES PATENT AND TRADEMARK OFFICE
CERTIFICATE OF CORRECTION

PATENT NO. : 8,606,800 B2  
APPLICATION NO. : 13/025752  
DATED : December 10, 2013  
INVENTOR(S) : Hardik H. Lazad et al.

Page 1 of 1

It is certified that error appears in the above-identified patent and that said Letters Patent is hereby corrected as shown below:

In the Specification

Col. 10, Line 65 "(A fl B∩C)" should read --(A ∩ B ∩ C)--;

Col. 13, Line 2 "clicking, the alpha symbol" should read --clicking the alpha symbol--;

Col. 13, Line 34 "as sown by FIG. 14," should read --as shown by FIG. 14--;

Col. 15, Line 16 "c [5]=null." should read --c [S]=null--;

Col. 15, Line 59 "c2' [T] = c2 [T] c3 [T]," should read --c2' [T] = c2 [T] ∩ c3 [T],--;

Col. 18, Line 27 "(N+...2N)" should read --(N+1...2N)--; and

Col. 21, Line 29 "sets of results: (R∩R2∩R3)," should read --sets of results: (R1 ∩ R2 ∩ R3),--.

Signed and Sealed this  
Twenty-third Day of September, 2014

Michelle K. Lee  
*Deputy Director of the United States Patent and Trademark Office*